United States Patent
Sidak

(10) Patent No.: US 12,204,577 B1
(45) Date of Patent: Jan. 21, 2025

(54) RECTIFYING MISSING OR INCORRECT LABELS IN UNSTRUCTURED DATA

(71) Applicant: Palantir Technologies Inc., Denver, CO (US)

(72) Inventor: Christian Sidak, West Palm Beach, FL (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 18/107,977

(22) Filed: Feb. 9, 2023

Related U.S. Application Data

(60) Provisional application No. 63/419,907, filed on Oct. 27, 2022.

(51) Int. Cl.
*G06F 16/35* (2019.01)
*G06V 10/778* (2022.01)

(52) U.S. Cl.
CPC ........ *G06F 16/355* (2019.01); *G06V 10/7788* (2022.01)

(58) Field of Classification Search
CPC .................................................... G06F 16/355
See application file for complete search history.

(56) References Cited

U.S. PATENT DOCUMENTS

| | | | |
|---|---|---|---|
| 11,893,459 B1 * | 2/2024 | Jacoby | G06F 16/2379 |
| 2023/0101817 A1 * | 3/2023 | Sinha | G06F 16/93 |
| | | | 707/722 |

* cited by examiner

*Primary Examiner* — Kristopher Andersen
(74) *Attorney, Agent, or Firm* — Sheppard Mullin Richter & Hampton LLP

(57) ABSTRACT

Computing systems methods, and non-transitory storage media are provided for receiving a first representation of an unstructured data entity. The first representation includes an indication of a detection. The unstructured data entity is part of a corpus. Next, second representations of the unstructured data entity are received and resolved according to a consensus. Next, any discrepancies between the first representation and the resolved second representations are determined. The any discrepancies include any difference in an existence or an absence of the detection, in a relative position of the detection, or in a type or a classification of the detection. Next, feedback regarding the any discrepancy is received. Next, the first representation is selectively modified, or selectively prompted to be modified, based on the any discrepancy and the feedback.

20 Claims, 20 Drawing Sheets

RECTIFYING MISSING OR INCORRECT LABELS IN UNSTRUCTURED DATA

CROSS-REFERENCE TO RELATED APPLICATION

This application claims the benefit under 35 U.S.C. 119 (e) of U.S. Provisional Application No. 63/419,907, filed Oct. 27, 2022, the content of which is hereby incorporated in its entirety.

FIELD OF THE INVENTION

This disclosure relates to approaches of resolving or rectifying missing or incorrect labels or annotations in unstructured data, such as media, unstructured text, and digital scent manifestations.

BACKGROUND

Unstructured data, such as media, unstructured text, log files, sensor data, emails, social media posts, and digital scent files, has rapidly proliferated. In particular, unstructured data is estimated to be growing at a rate of 50 percent every year. An estimated 80 percent of all data is unstructured. In 2020, an estimated 30 zettabytes of new unstructured data was created globally. In 2025, that figure is expected to reach 150 zettabytes worldwide. Processing and analysis of unstructured data remains somewhat of a bottleneck. Thus, the ability to leverage and harness unstructured data may be a conundrum in the computing realm.

One specific shortcoming is the ability to ensure correct labels or annotations in unstructured data entities, such as files. For example, within a corpus of unstructured data entities, at least some may be missing labels or incorrectly labeled. If these deficiently or improperly labeled unstructured data entities are applied to training, testing, or validating a machine learning component, then such missing or incorrect labels may compromise a veracity and/or accuracy of the machine learning component. Thus, confirming accuracy and completeness of labels or annotations in unstructured data entities is a nontrivial problem plaguing machine learning scientists today.

SUMMARY

Various examples of the present disclosure can include computing systems, methods, and non-transitory computer readable media configured to perform: receiving a first representation of an unstructured data entity, wherein the first representation comprises any indication of a detection, the unstructured data entity being comprised within a corpus; receiving second representations of the unstructured data entity; resolving the second representations based on a consensus; determining any discrepancy between the first representation and the resolved second representations, wherein the any discrepancy comprises any difference in an existence or an absence of the detection, in a relative position of the detection, or in a type or a classification of the detection; receiving feedback regarding the any discrepancy; and selectively modifying, or selectively prompting the modification of, the first representation based on the any discrepancy and the feedback.

In some examples, the second representations are resolved according to the consensus, the consensus being determined according to respective outputs among machine learning components, and the selectively modifying, or selectively prompting the modification of, the first representation, comprises selectively relabeling, or selectively prompting the relabeling of, the first representation.

In some examples, the received feedback is associated with whether the first representation is mislabeled; and the selectively relabeling, or selectively prompting the relabeling of, the first representation, comprises: transmitting an indication regarding the any discrepancy between the first representation and the resolved second representations; and selectively adding, removing, or changing a labeling, or selectively prompting the adding, removing, or changing of the labeling of, the first representation based on the determination of any discrepancy and the feedback.

In some examples, the selectively adding, removing, or changing a labeling, or selectively prompting the adding, removing, or changing of the labeling of, the first representation comprises: prompting the adding, removing, or changing of the labeling of the first representation in response to the feedback confirming a veracity of the resolved second representations; and leaving the first representation unchanged in response to the feedback confirming a veracity of the first representation.

In some examples, the unstructured data entity comprises a media entity or unstructured text.

In some examples, the unstructured data entity comprises a media entity; and the first representation or the resolved second representations comprise one or more bounding boxes and one or more respective annotations corresponding to the bounding boxes.

In some examples, the resolved second representations correspond to a subset of representations generated or outputted from respective machine learning components, the subset of representations corresponding to an indication of an existence or an absence of the detection, and in response to the subset of representations corresponding to the indication of the existence of the detection, most frequently occurring positions of bounding boxes and most frequently occurring annotations corresponding to the bounding boxes.

In some examples, the detection comprises an object, an event, or an inference.

In some examples, the instructions further cause the system to perform: determining a first score indicative of a degree of certainty of the existence of the any detection based on a proportion of machine learning components indicating the existence of the any detection, wherein the receiving of the feedback is in response to the first score satisfying a threshold.

In some examples, the first representation is manually annotated.

These and other features of the computing systems, methods, and non-transitory computer readable media disclosed herein, as well as the methods of operation and functions of the related elements of structure and the combination of parts, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings. Any principles or concepts illustrated in one figure may be applicable to any other relevant figures. For example, principles illustrated in FIG. 1 may also be applicable to any of FIGS. 2-17 and vice versa.

DETAILED DESCRIPTION

In some current implementations, a corpus of unstructured data may be fed into one or more machine learning components or models (hereinafter "components") to train, validate, and/or test such machine learning components. Erroneous or missing labels within the corpus may compromise performance of such machine learning components, thereby resulting in inaccurate inferences, predictions, or determinations by the machine learning components. The frequency of these erroneous or missing labels is a testament that improvements in accurately labeling the corpus would result in enhanced accuracy of the machine learning components. This enhanced accuracy is a catalyst that will lead to augmented capabilities of analysis, monitoring, and other applications such as navigation, planning or coordination of certain activities. Moreover, such improvements, as described below, are attained while reducing computing processing costs by batching detections (e.g., simultaneously processing a batch, or group, of detections), selecting specific models having among highest performances in general and/or for specific categories of objects and/or inferences, and filtering out lower confidence detections.

Figure 1:
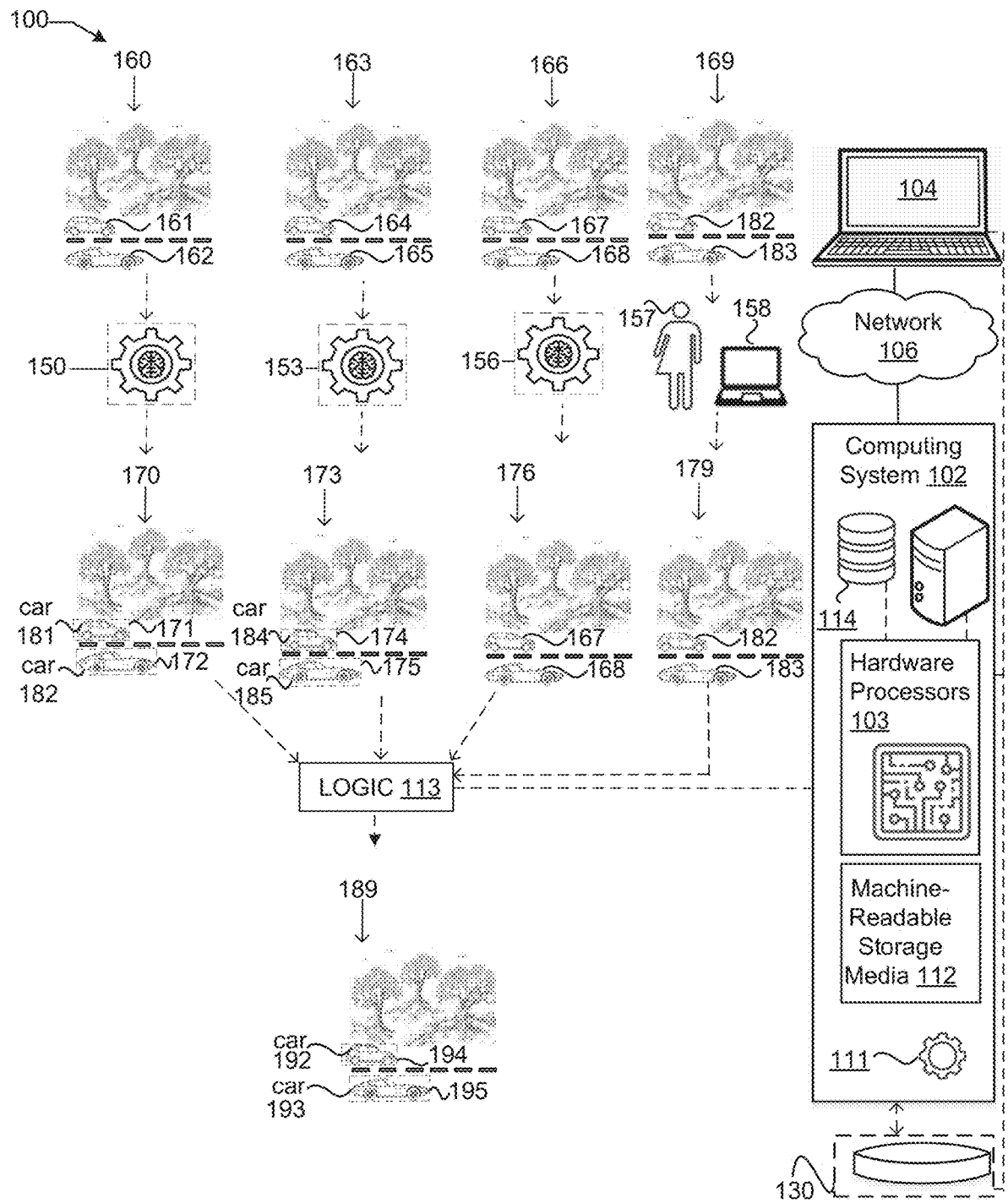
FIG. 1 illustrates an example implementation, in accordance with various examples, of a computing system that performs or prompts correction of any missing or erroneous annotations in media, such as an image and/or a video. The annotations in FIG. 1 may correspond to objects.

FIG. 1 illustrates an example implementation or scenario (hereinafter "implementation") 100, of a computing system 102 that improves veracity and/or accuracy of labels or annotations that are fed into a machine learning component for training, testing, and/or validation. The diversity and versatility of supported data types, formats, and/or scenarios is reflected at least in FIGS. 1-16. For example, the labels or annotations may pertain to any of diagnosis, prescriptive analysis in which a course of action may be recommended, intentions, emotional states, objects, object instances, activities, events, and classifications or categories.

The implementation 100 can include at least one computing device 104 which may be operated by an entity such as a user. The user may submit a request or query through the computing device 104. Such a request or query may relate to operations on or pertaining to results of analysis or processing of a corpus of unstructured data and/or labels or annotations within the corpus. A portion or all of the results of analysis or processing may be stored in a database 130.

In some examples, the computing device 104 may visually render any outputs generated from analysis or processing, and/or from the database 130. In general, the user can interact with the database 130 directly or over a network 106, for example, through one or more graphical user interfaces, application programming interfaces (APIs), and/or webhooks. The computing device 104 may include one or more processors and memory.

The computing system 102 may include one or more processors 103 which may be configured to perform various operations by interpreting machine-readable instructions, for example, from a machine-readable storage media 112. In some examples, one or more of the processors 103 may be combined or integrated into a single processor, and some or all functions performed by one or more of the hardware processors 103 may not be spatially separated, but instead may be performed by a common processor. The processors 103 may be physical or virtual entities. For example, as virtual entities, the processors 103 may be encompassed within, or manifested as, a program within a cloud environment. The processors 103 may constitute separate programs or applications compared to the machine learning components. The computing system 102 may also include a storage 114, which may include a cache for faster access compared to the database 130.

The hardware processors 103 may further be connected to, include, or be embedded with logic 113 which, for example, may include protocol that is executed to carry out the functions of the hardware processors 103. In general, the logic 113 may be implemented, in whole or in part, as software that is capable of running on the computing system 102, and may be read or executed from the machine-readable storage media 112. The logic 113 may include, as nonlimiting examples, parameters, expressions, functions, arguments, evaluations, conditions, and/or code. Here, in some examples, the logic 113 encompasses functions of or related to processing or analysis of a corpus of unstructured data, which may be fed as a training corpus into a machine learning component for training, validation, and/or testing. Functions or operations described with respect to the logic 113 may be associated with a single processor or multiple processors. Functions or operations within the logic 113 will be subsequently described, following a description of the database 130.

The database 130 may include, or be capable of obtaining, information such as unstructured data, encompassing, as nonlimiting examples, media, unstructured text, and/or digital scent files or manifestations. This information may be ingested, and/or originate from, one or more different data sources or databases. The database 130 may, additionally or alternatively, store first representations and/or second representations of the unstructured data. For example, first representations may include unstructured data that has been augmented by any labels and/or annotations which describes one or more objects, entities, events, activities, and/or inferences. The first representations may have been manually and/or computer labeled. The logic 113 may evaluate and/or verify the veracity or accuracy (hereinafter "accuracy") of any labels and/or annotations (hereinafter "annotations") of the first representations. Here, "any" may refer to any integer, including zero and positive values. The second representations, meanwhile, may include any unstructured data that has been augmented by any labels and/or annotations, via respective machine learning components. These annotations may describe one or more objects, entities, events, activities, and/or inferences. Thus, each second representation may have been fed into and/or processed by a machine learning component, to predict and/or determine any appropriate labels and/or annotations to be applied onto the unstructured data. The database 130 may store unstructured data that is in raw form, meaning that the unstructured data has not been annotated and/or labeled, and/or any results indicating whether the first representations are accurate following comparison with the second representations.

The logic 113 may be configured to perform processing and/or analysis functions by ingesting, obtaining, or receiving a first representation, which may have been manually and/or computer labeled or annotated, and determining or verifying an accuracy of the first representation. For example, the logic 113 may verify an accuracy of any annotations and/or detect any missing or incorrect annotations within the first representation. The logic 113 may also receive second representations, which have been annotated by respective machine learning components. The logic 113 may resolve the second representations according to a consensus among the machine learning components, verify accuracy of the any annotations of the first representation according to the resolved second representations, and modify or prompt modification of any inaccurate annotations of the first representation. If any annotations of the first representation differ from those of the resolved second representations, the logic 113 may selectively prompt or request feedback or confirmation regarding a veracity of a resolved second representations, and upon receiving such confirmation, may prompt a modification of the first representation so that the first representation becomes consistent with the resolved second representations. Annotations of the first representation may be compared to respective annotations of the resolved second representations at a common location or position. Alternatively or additionally, the annotations of the first representation may be compared to respective annotations of the resolved second representations at a common time, image, or frame.

Figure 17:
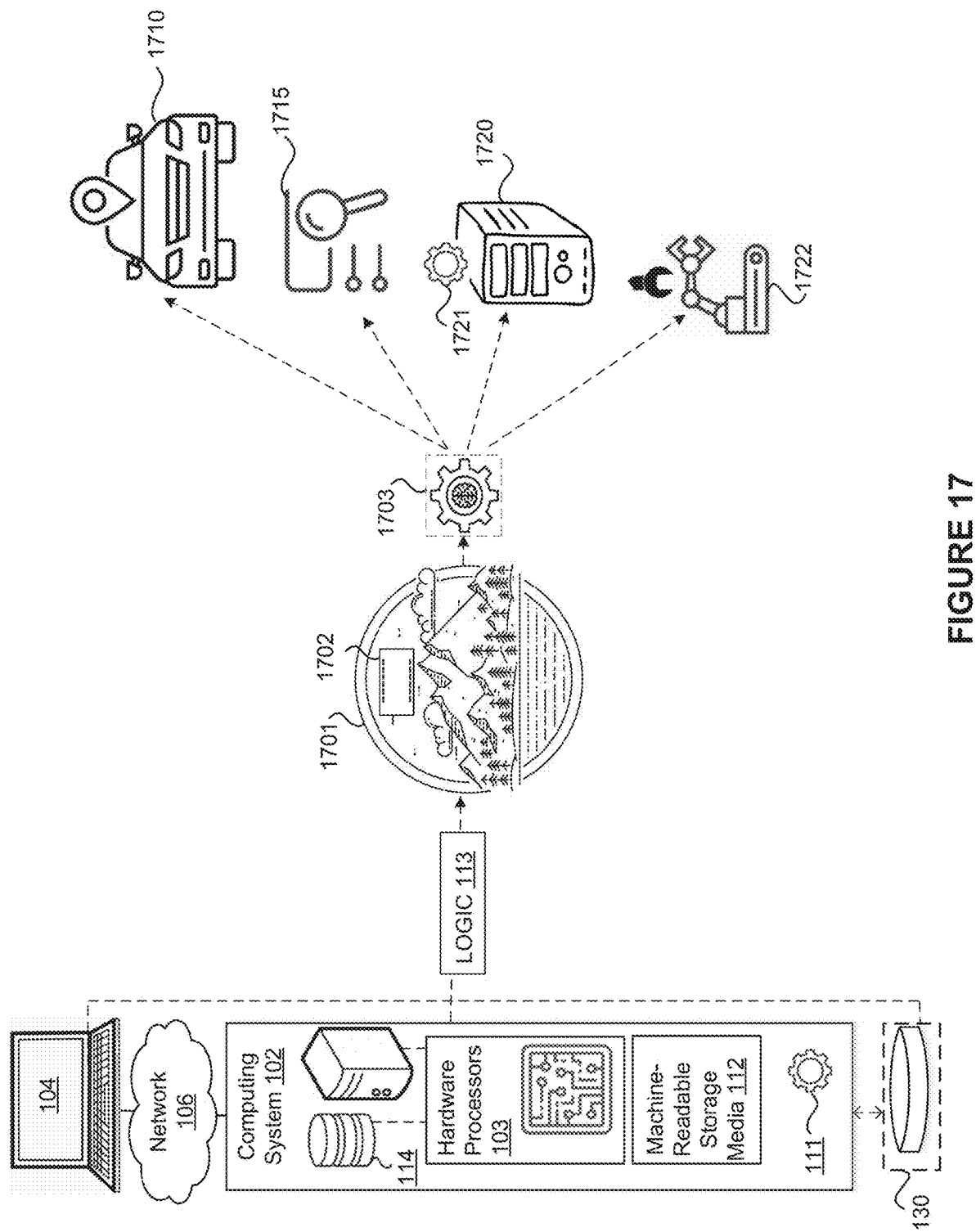
FIG. 17 illustrates an example implementation, in accordance with various examples, of a computing system that performs downstream actions following the correction of any labels.

As illustrated in FIG. 17, once the accuracy of the any annotations has been verified, or inaccurate annotations modified, the annotations may be fed into machine learning components to train, validate, and/or test the machine learning components. In turn, the trained machine learning components may be applied to downstream implementations such as navigation, monitoring, analysis, and/or other physical or tangible processes, which would be executed more effectively and accurately due to accurate training, validation, and/or testing of the machine learning components.

The computing system 102 may further include one or more application programming interfaces (APIs) 111 which may manage or coordinate a parallel compute framework to perform tasks such as entity detection and/or entity resolution, and to perform geometric operations and analysis on bounding boxes.

In FIG. 1, unstructured data entities 160, 163, 166, and 169 may include images. The unstructured data entities 160, 163, and 166 may include entities or objects (hereinafter "objects") 161 and 162, 164 and 165, and 167 and 168, respectively. Here, the objects 161, 162, 164, 165, 167, and 168 may include vehicles such as cars. In some examples, the unstructured data entities 160, 163, and 166 may be identical images, but analyzed/processed by different components, such as different machine learning components. Meanwhile, the unstructured data entity 169 may be labeled manually by a human entity 157 and/or automatically by a computer entity 158 (e.g., by a human labeler or a computer labeler, separate from the machine learning components).

The unstructured data entities 160, 163, and 166 may be fed or ingested into respective machine learning components 150, 153, and 156. The machine learning components 150, 153, and 156 may include models and/or techniques which may be supervised, such as, without limitation, Convolutional Neural Network-Long Short-Term Memory (CNN-LSTM), perceptrons, decision trees, random forest, Support Vector Machine (SVM), classification, Bayes, k-nearest neighbor (KNN), gradient boosting such as XGBoost. The logic 113 may perform processing and/or analysis of machine learning outputs agnostic of specific types or classifications of the machine learning components.

The machine learning components 150, 153, and 156 may encompass docker files or images. The machine learning components 150, 153, and 156 may read images and output any detections in a JSON (JavaScript Object Notation) format. Any of the machine learning components 150, 153, and 156 may be, or include, different types of machine learning components, or alternatively, common types of machine learning components or common machine learning components, that may be trained using different data. For example, a first subset of a corpus may have been used to train a first machine learning component and a second subset of the corpus may have been used to train a second machine learning component. Although three machine learning components are illustrated in FIG. 1, any number of machine learning components may perform analysis.

The unstructured data entities 160, 163, and 166, following processing by the machine learning components 150, 153, and 156, respectively, may be modified or transformed into second representations 170, 173, and 176, respectively. The second representations 170, 173, and 176 may include annotated versions of the unstructured data entities 160, 163, and 166, respectively, which may include any bounding boxes and/or annotations corresponding to the respective bounding boxes. For example, the second representation 170 may include bounding boxes 171 and 172 corresponding to annotations 181 and 182, respectively. The annotations 181 and 182 may indicate existence of cars. Meanwhile, the second representation 173 may include bounding boxes 174 and 175 corresponding to annotations 184 and 185, respectively. The annotations 184 and 185 may indicate existence of cars. Meanwhile, the second representation 176 may be a same as the unstructured data entity 166, and may not have any bounding boxes or annotations. In particular, the machine learning component 156 may have missed detection and/or classification of objects within the unstructured data entity 166. The first representation 179 may also not have any bounding boxes or annotations and may be the same as the unstructured data entity 169. In particular, the human entity 157 and/or the computer entity 158 may have missed detection and/or classification of objects within the unstructured data entity 169.

The logic 113 may resolve the second representations 170, 173, and 176. Although a number of the second representations, 170, 173, and 176, add up to three in FIG. 1, any plural number of second representations may exist. Each second representation may have been processed by a machine learning component, which may determine any bounding boxes and respective annotations within that second representation, as explained above.

The resolving of the second representations may be according to a consensus, which may entail a majority or a plurality of second representations having common bounding boxes and/or relative positions (hereinafter "bounding boxes") and common annotations. In some examples, the resolving of the second representations may incorporate confidence levels of detection of the individual machine learning components 150, 153, and 156. In some examples, if a confidence level of detection fails to satisfy some condition or threshold, that detection may be removed or filtered out to conserve computing processing costs.

In FIG. 1, of the second representations 170, 173, and 176, two of the three have common relative positions of bounding boxes and annotations. In particular, the bounding boxes 171 and 172 of the second representation 170 and the bounding boxes 174 and 175 of the second representation 173 have common relative positions. The annotations 181 and 182 of the second representation 170, as well as the annotations 184 and 185 of the second representation 173, also match. Here, two out of three constitutes a majority. Thus, the resolving of the second representations here is according to the two out of three which have matching bounding boxes (171, 172 and 174, 175) and matching annotations (181, 182 and 184, 185). In other words, two of the three machine learning components, 150 and 153, agree, or have a consensus, regarding locations of the bounding boxes (171, 172 and 174, 175) as well as annotations indicating classifications of objects within the bounding boxes (181, 182 and 184, 185) corresponding to cars.

Figure 2:
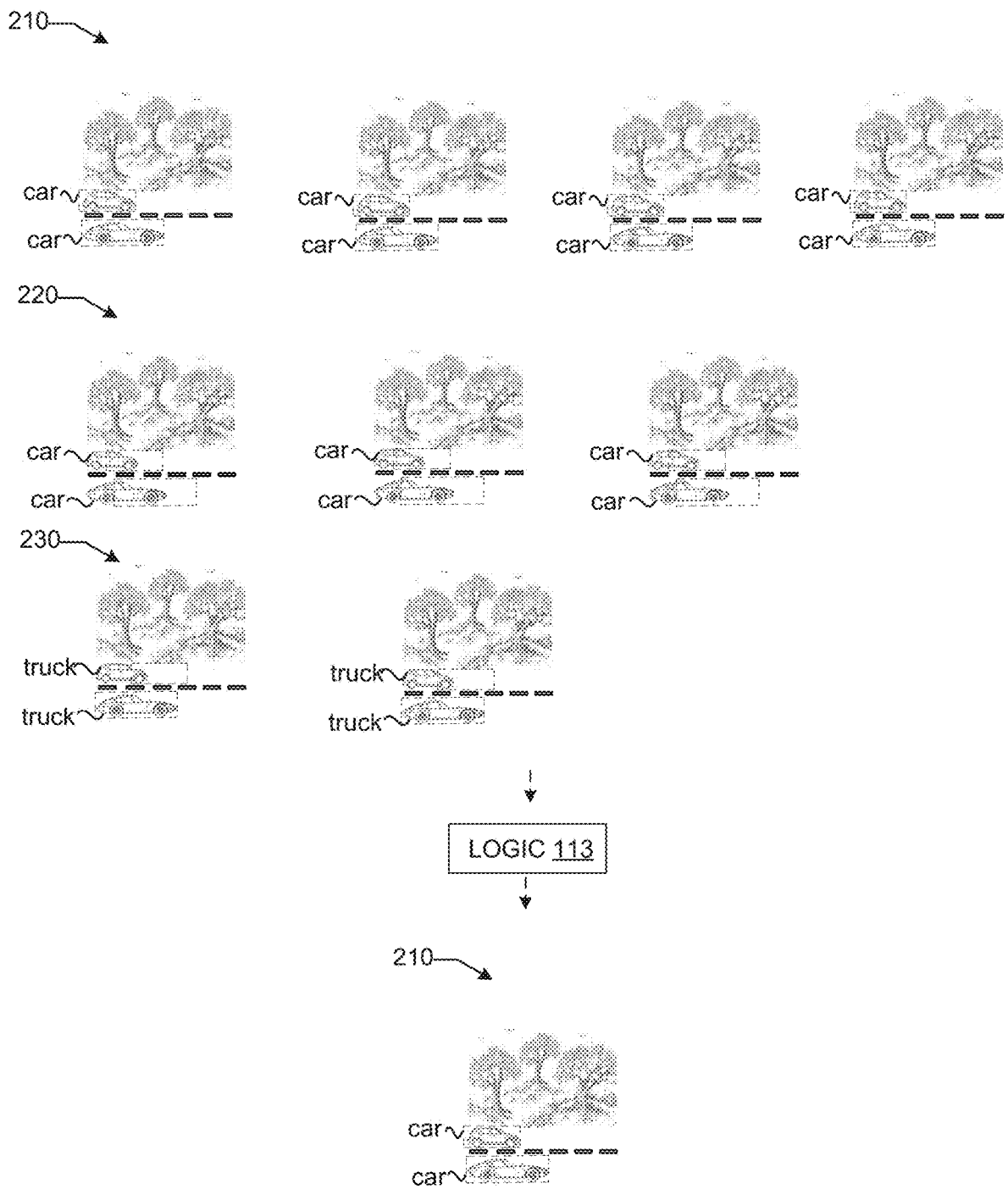
FIG. 2 illustrates an example implementation, in accordance with various examples, of a computing system that determines a consensus.

In other scenarios, resolving of the second representations may be according to a plurality of second representations having common bounding boxes and common annotations. For example, in FIG. 2, four of the second representations within a group 210 may have common bounding boxes and common annotations, another three of the second representations within a group 220 may have common bounding boxes and common annotations, and another two of the second representations within a group 230 may have common bounding boxes and common annotations. In other words, each distinct group 210, 220, and 230 may have either or both distinct positions of bounding boxes or annotations indicating classification of objects within the bounding boxes, compared to those of the other groups. In FIG. 2, the resolving of the second representations would be according to the four of the second representations within the group 210 having common bounding boxes and common annotations, which fails to constitute a majority but rather, constitutes a plurality. In an event of a tie of a frequency of occurrence between two of the most frequently occurring second representations, the consensus may be determined according to either of the most frequently occurring second representations. Such determination may be random, or alternatively, determined according to weighting according to the respective machine learning components. As a specific example, a tie would occur if the group 210 had four of the second representations and the group 220 also had four of the second representations. Specifically, the group 210 may have annotations of "car" which is a more specific classification while the group 220 may have annotations of "vehicle" as a more general classification. In such a scenario, assuming that the groups 210 and 220 represent the most commonly occurring annotations within a bounding box or relative location, the determination of whether the group 210 or the group 220 represents the consensus may be determined according to any of the aforementioned factors. For example, if particular machine learning components that annotated "vehicle" were weighted more heavily compared to the machine learning components that annotated "car," then the group 220 may be deemed the consensus group.

The determination of whether two representations indeed have common bounding boxes may be based on an extent of overlap of common relative positions or locations between two bounding boxes of the two representations. For example, if one bounding box is completely subsumed within another bounding box and respective annotations or classifications within the two bounding boxes are identical, then these two bounding boxes may constitute common bounding boxes. In some examples, if the extent of overlap of one bounding box with another bounding box satisfies a threshold and the two bounding boxes have common annotations or classifications, then these two bounding boxes may be deemed to be common bounding boxes. For example, the extent of overlap may be an area of a common region to the two bounding boxes divided by an area of a smaller of the two bounding boxes, if the two bounding boxes are of different sizes, or an area of either of the two bounding boxes, if the two bounding boxes are of same sizes. In some examples, the bounding boxes may have one or more slanted lines.

In some examples, if the resolved second representations, here corresponding to 170 and 173, deviate from the first representation 179, then the logic 113 may flag the first representation to be reviewed for accuracy or veracity, and/or prompt feedback or confirmation, for example, by a human entity, regarding an accuracy or veracity of the first representation 179. Thus, the logic 113 may determine any discrepancies in detections between the first representation 179 and the resolved second representations. Such discrepancies may include, for example, the first representation 179 being devoid of or missing an annotation or detection at a particular location or position while the second representation has such an annotation or detection at that particular location or position, which may be applicable in an image, a video, or unstructured text. Additionally or alternatively, such discrepancies may include the first representation 179 actually having an annotation or detection at a particular location while the resolved second representations are devoid of or missing such an annotation or detection at that particular location. Additionally or alternatively, such discrepancies may include the first representation having an annotation or detection within a particular image or video frame, at a particular time, and/or at a particular position or location, while the resolved second representations are devoid of or missing such an annotation or detection at that particular time, that particular position and/or at that particular location.

Returning to FIG. 1, the resolved second representations illustrated here do deviate from the first representation 179, because the latter is devoid of bounding boxes and annotations while the resolved second representations include bounding boxes and annotations. In other examples, instead of the first representation 179 missing an annotation entirely, if the first representation 179 did have a label but it indicated an erroneous position or classification, such as "truck," such a discrepancy would also be flagged for potential correction. In other examples, the logic 113 may flag the first representation to be reviewed for accuracy or veracity, and/or prompt feedback or confirmation, for example, by a human entity, only if the consensus constitutes a majority of the second representations or at least a certain proportion of the machine learning components (e.g., more than 50% of the machine learning components) agree on a most frequently occurring consensus of the second representations. Additionally or alternatively, the machine learning components may be divided into groups according to their sources. The logic 113 may determine a consensus of each group. If a supermajority of the groups have a common consensus, then the logic 113 may flag the first representation to be reviewed for accuracy or veracity, and/or prompt feedback, for example, by a human entity.

To reduce computing processing costs, the resolving of the second representations may entail batching detections, selecting a cohort of specific components or models having among highest performances in general and/or for specific categories of objects and/or inferences, and filtering out lower confidence detections (e.g., below a confidence threshold). The batching of detections may include dividing the processing into batches of detections (e.g., objects, inferences, classifications), determining extents of overlaps within each particular batch, and determining matches of annotations or classifications within each particular batch. A batch size may be determined based on a time consumed in processing or inferencing each detection or unstructured data entity, an amount of available computing resources such as number of graphics processing units (GPUs), and a number of machine learning components or models to be run.

Upon receiving the feedback or review that the resolved second representations are correct and the first representation is erroneous, the logic 113 may prompt or request that the first representation be labeled or annotated according to the resolved second representations. The first representation may then be manually annotated as a corrected representation 189, including bounding boxes 194 and 195, and/or respective annotations 192 and 193. In other examples, the first representation may be automatically annotated as the corrected representation 189, including the bounding boxes 194 and 195, and the respective annotations 192 and 193. However, if the feedback or review indicates that the first representation is correct and that the resolved second representations are incorrect, then the logic 113 may refrain from prompting a change of, or from automatically changing the first representation.

Figure 3:
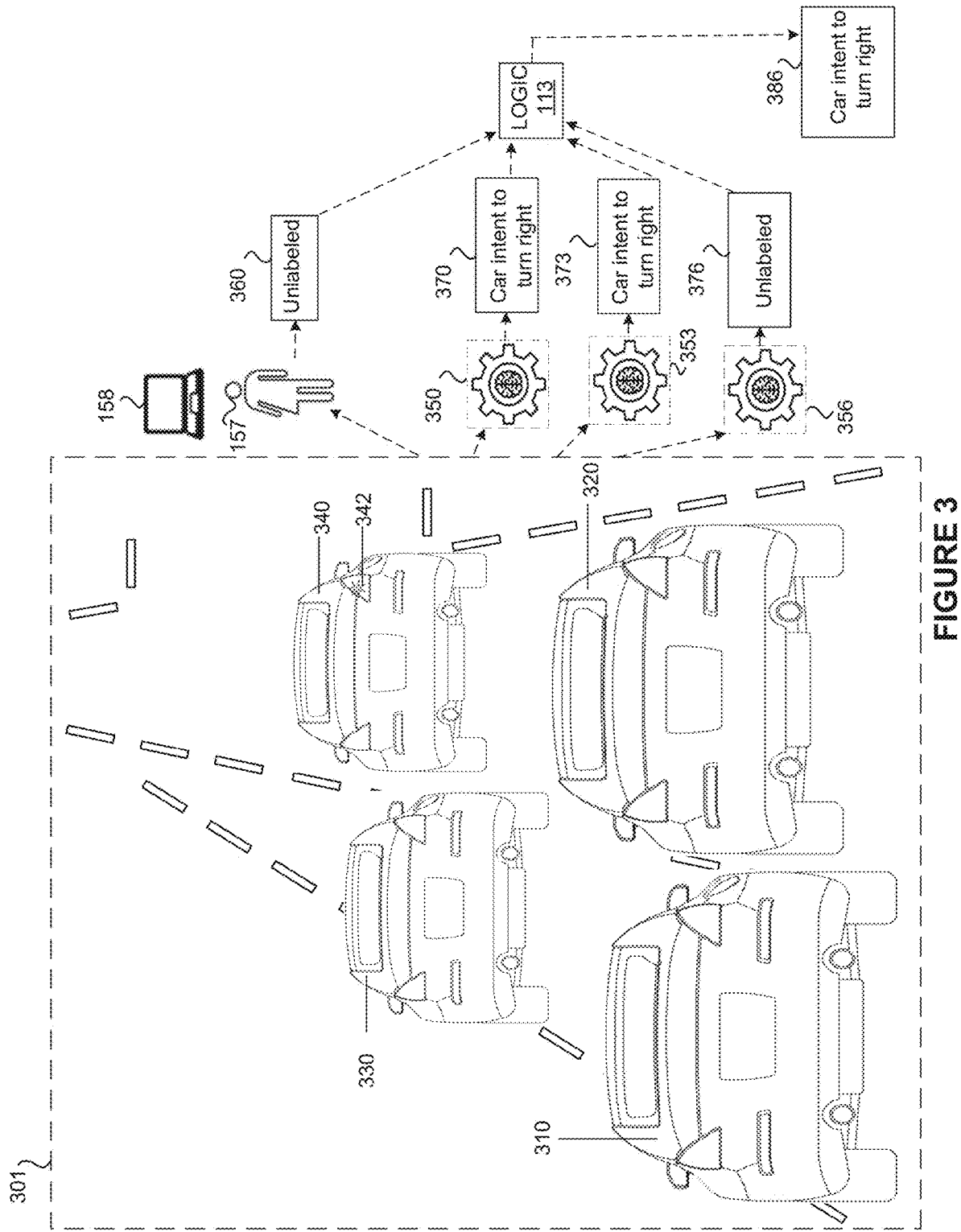
FIG. 3 illustrates an example implementation, in accordance with various examples, of a computing system that performs or prompts correction of any missing or erroneous annotations in media, such as an image and/or a video. The annotations in FIG. 3 may correspond to intentions inferred from a context of the image and/or the video.

FIGS. 3-16 illustrate alternative implementations or extensions of FIG. 1. In FIGS. 3-16, the resolving of the second representations, and the labeling of the first representation following feedback or confirmation, may be implemented according to same or similar principles as described in FIG. 1. Other relevant principles described in FIG. 1 may also be applicable to FIGS. 3-16. In FIGS. 3-16, only one unstructured data entity, instead of the three unstructured data entities shown in FIG. 1, is illustrated for simplicity, since a common unstructured data entity is processed by the machine learning models (for example, 150, 153, and 156) as well as by the manual or automatic labeler (the human entity 157 and/or the computer entity 158). FIG. 3 illustrates an unstructured data entity 301 that may be fed separately into machine learning components 350, 353, and 356, which may have an objective or purpose of detecting, outputting, and/or indicating intentions of objects. The machine learning components 350, 353, and 356 may generate second representations which may be annotated versions of the unstructured data entity 301. As mentioned in FIG. 1, any of the machine learning components 350, 353, and 356 may each encompass different models, different techniques, and/or common models and/or techniques but trained differently or using a different portion of training data, from one another.

Thus, in FIG. 3, instead of indicating classifications or types of objects within an unstructured data entity, as in FIG. 1, the machine learning components 350, 353, and 356, may output and indicate one or more intentions of objects within the unstructured data entity 301. The unstructured data entity 301 may include one or more images or a video having objects 310, 320, 330, and 340, and a turn signal 342 on the object 330. Here, the objects 310, 320, 330, and 340 include cars. The machine learning components 350, 353, and 356 may infer or predict an intention of the car 340 based on a contextual situation, such as relative locations of other cars and/or a behavior or status of the turn signal 342. Here, the machine learning components 350 and 353 may output second representations 370 and 373, which further annotate the unstructured data entity 301 to indicate that the car 340 intends to turn right. However, the machine learning component 356 may output a second representation 376 which is unlabeled and unannotated, and unchanged from the unstructured data entity 301, because the machine learning component 356 may have missed the inference of the car 340 intending to turn right. In some examples, any of the machine learning components 350, 353, and 356 may further output specific objects that factored into the inference or prediction, such as the turn signal 342, and/or specific bounding boxes of relevant objects for which the inference has been made. Meanwhile, the human entity 157 and/or the computer entity 158 may also have missed annotating the unstructured data entity 301; thus, a first representation 376 generated or outputted by the human entity 157 and/or the computer entity 158 may be missing any annotations of the inference that the car 340 intends to turn right. In other examples, the human entity 157 and/or the computer entity 158 may also have misidentified, rather than failed to label, the first representation. For example, the human entity 157 and/or the computer entity 158 may have indicated that the intention of the car 340 is to turn left instead of right. In such examples, just as in a scenario of a missing annotation, this erroneous annotation may also be rectified following the consensus and feedback mechanism described in FIG. 1.

In FIG. 3, a consensus among two of the three machine learning components is that the intention of the car 340 is to turn right. This consensus satisfies a majority of the three machine learning components 350, 353, and 356. This consensus also indicates a discrepancy or deviation from the first representation 376, which is unlabeled and thus indicates no intention. Thus, in a same or similar manner to that explained in FIG. 1, the logic 113 may prompt feedback and/or confirmation as to whether the consensus is accurate. If the logic 113 receives an indication that the consensus is accurate, the logic 113 may prompt or request labeling or annotating of the first representation 376 to correct the erroneous and/or missing annotations in the first representation 376 to indicate that the intention of the car 340 is to turn right, as illustrated in corrected representation 386.

Figure 4:
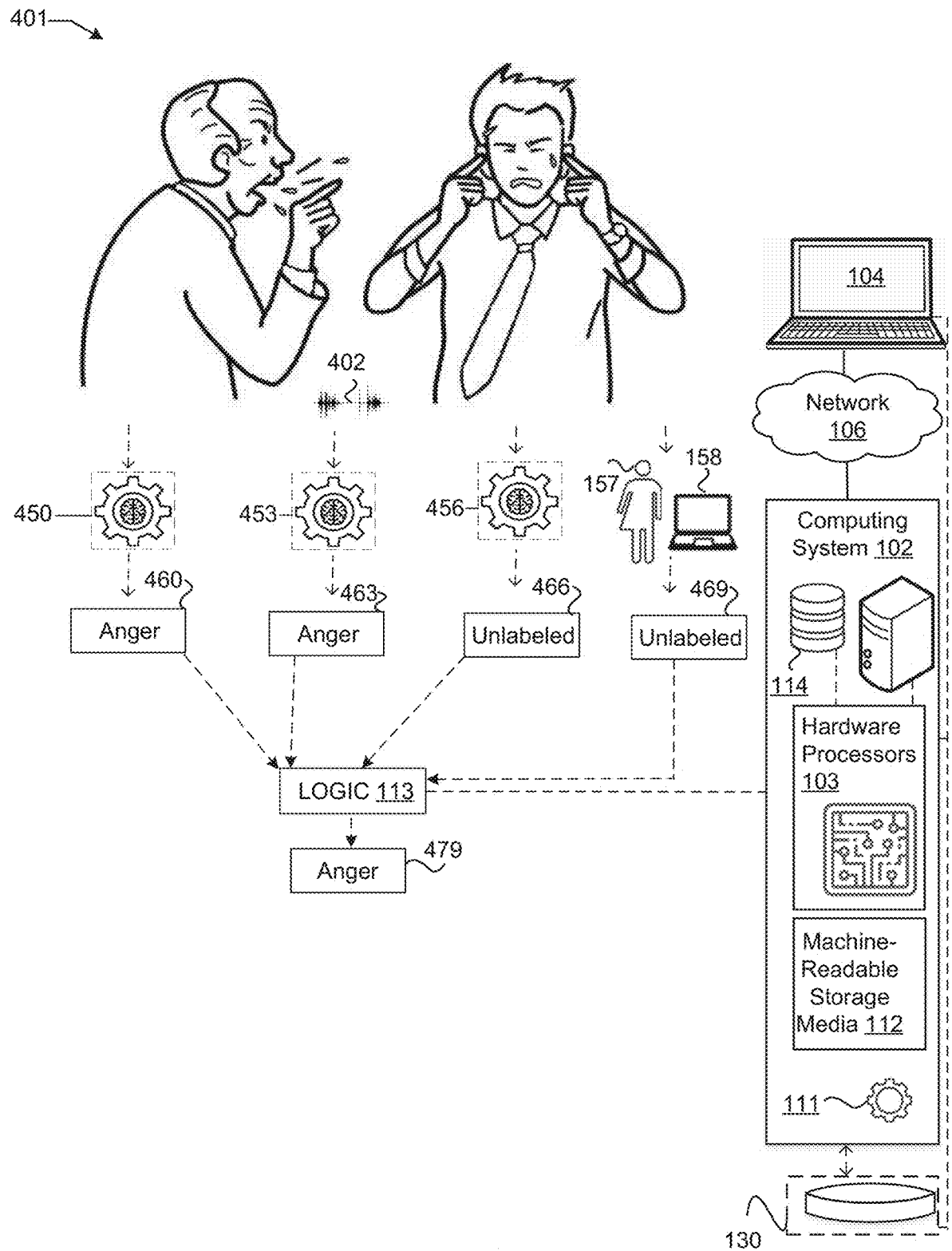
FIG. 4 illustrates an example implementation, in accordance with various examples, of a computing system that performs or prompts correction of any missing or erroneous annotations in media, such as an image, video, and/or an audio. The annotations in FIG. 4 may correspond to intentions inferred from a context of the image and/or the video.

FIG. 4 illustrates a further extension of an annotation or label indicative of an emotion. In FIG. 4, an unstructured data entity 401 may be fed separately into machine learning components 450, 453, and 456, each of which may infer and annotate any one or more emotions upon generating a second representation. Thus, in FIG. 4, instead of indicating classifications or types of objects within an unstructured data entity, as in FIG. 1, the machine learning components 450, 453, and 456, may have an objective or purpose of detecting, outputting, and/or indicating one or more emotions within the unstructured data entity 401. The unstructured data entity 401 may include one or more images or a video, and/or audio 402. The machine learning components 450, 453, and 456 may infer or predict an emotion of a scene or scenes based on a contextual situation, such as expressions of humans, actions of humans, and/or relative locations of humans and/or other objects. Here, the machine learning components 450 and 453 may output second representations 460 and 463, which further annotate the unstructured data entity 401 to indicate an emotion of anger. However, the machine learning component 456 may output a second representation 466 which is unlabeled and unannotated, and unchanged from the unstructured data entity 401, because the machine learning component 456 may have missed the identification of the emotion of anger. In some examples, any of the machine learning components 350, 353, and 356 may further output specific objects that factored into the inference or prediction of anger, such as a person's facial expressions, and/or specific bounding boxes of relevant objects for which the inference has been made. Meanwhile, the human entity 157 and/or the computer entity 158 may also have missed annotating the unstructured data entity 401; thus, a first representation 469 generated or outputted by the human entity 157 and/or the computer entity 158 may be missing any annotations of the emotion of anger. In other examples, the human entity 157 and/or the computer entity 158 may also have misidentified, rather than failed to label, the first representation. For example, the human entity 157 and/or the computer entity 158 may have indicated that the emotion was ambivalent instead of angry. In such examples, just as in a scenario of a missing annotation, this erroneous annotation may also be rectified following the consensus and feedback mechanism described in FIG. 1.

In FIG. 4, a consensus among two of the three machine learning components is that the emotion is anger. This consensus satisfies a majority of the three machine learning components 450, 453, and 456. This consensus also indicates a discrepancy or deviation from the first representation 469, which is unlabeled and thus indicates no emotion. Thus, in a same or similar manner to that explained in FIG. 1, the logic 113 may prompt feedback and/or confirmation as to whether the consensus is accurate. If the logic 113 receives an indication that the consensus is accurate, the logic 113 may prompt or request labeling or annotating of the first representation 469 to indicate that the emotion is anger, as illustrated in corrected representation 479.

Figure 5:
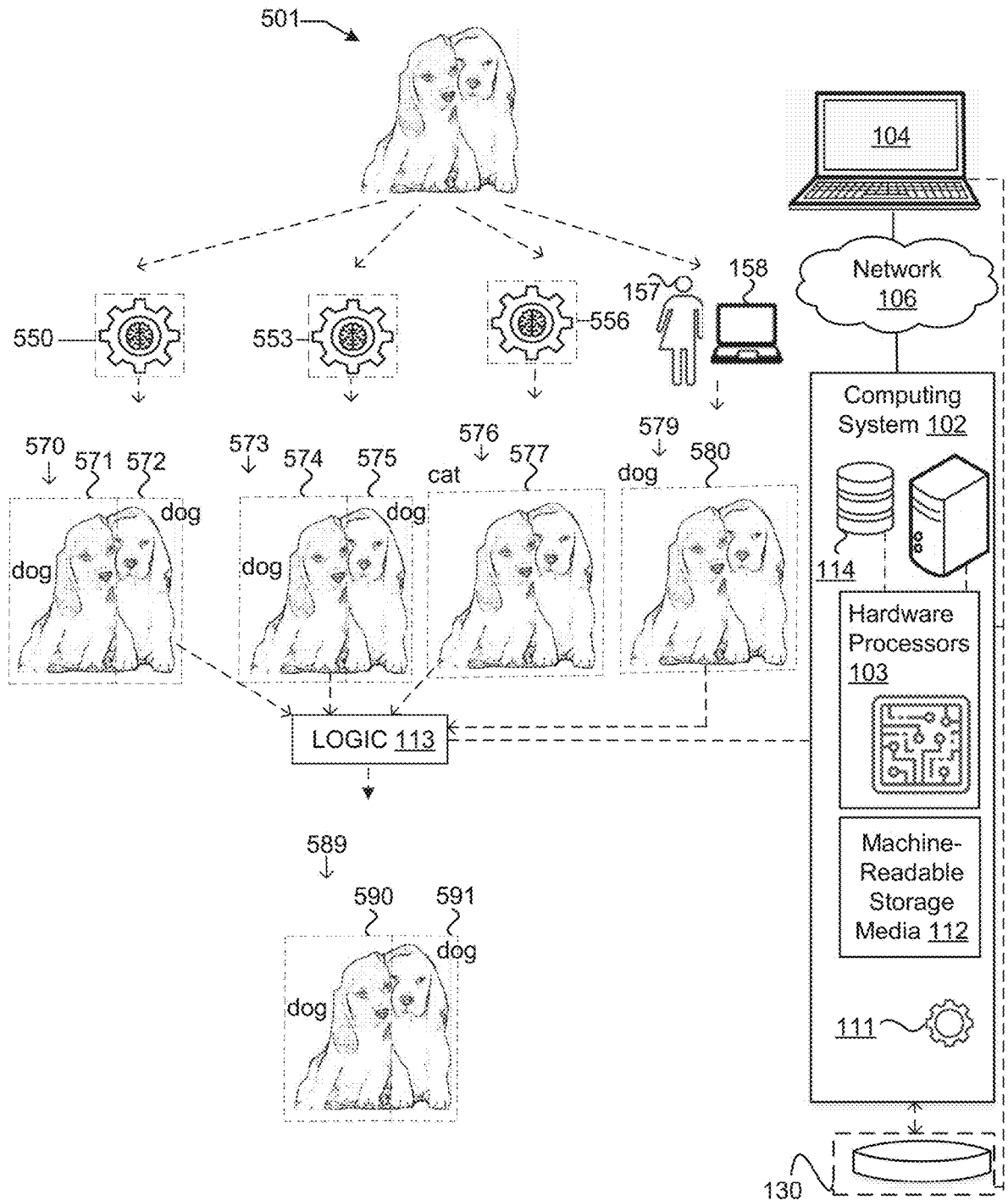
FIG. 5 illustrates an example implementation, in accordance with various examples, of a computing system that performs or prompts correction of any missing or erroneous annotations in media, such as an image and/or a video. The annotations in FIG. 5 may correspond to emotional states inferred from a context of the image and/or the video.

FIG. 5 illustrates a further extension of an annotation or label indicative of separate instances of objects, especially those that may be difficult to distinguish and/or close together, similar to instance segmentation. In FIG. 5, an unstructured data entity 501 may be fed separately into machine learning components 550, 553, and 556, each of which may have an objective of detecting separate instances of objects, here, dogs, within the unstructured data entity 501. The unstructured data entity 501 may include one or more images or a video. The machine learning components 550, 553, and 556 may generate or draw bounding boxes around each separate instance of a dog. Here, the machine learning components 550 and 553 may output second representations 570 and 573, which further annotate the unstructured data entity 501 to indicate separate instances of dogs. Specifically, in the second representation 570, bounding boxes 571 and 572 have been generated or outputted by the machine learning component 550 to indicate separate instances of the dogs, along with respective annotations of dogs. In the second representation 573, bounding boxes 574 and 575 have been generated or outputted by the machine learning component 553 to indicate separate instances of the dogs, along with respective annotations of dogs. However, the machine learning component 556 may output a second representation 576 which includes only a single bounding box 577, and incorrectly annotates the second representation 576 as a "cat." Thus, the machine learning component 556 may have missed the identification of separate instances of dogs, let alone the existence of a dog. Meanwhile, the human entity 157 and/or the computer entity 158 may also have missed annotating the unstructured data entity 501, and may have only annotated a single instance of "dog" rather than each of the separate instances, within a bounding box 580 of a first representation 579. Thus, the first representation 579 generated or outputted by the human entity 157 and/or the computer entity 158 may be missing separate annotations corresponding to separate instances of the dogs. In other examples, the human entity 157 and/or the computer entity 158 may also have misidentified, rather than failed to label, the first representation. For example, the human entity 157 and/or the computer entity 158 may have indicated a "cat" instead of a "dog." In such examples, just as in a scenario of a missing annotation, this erroneous annotation may also be rectified following the consensus and feedback mechanism described in FIG. 1.

In FIG. 5, a consensus among two of the three machine learning components is that two separate instances of a dog exist. This consensus satisfies a majority of the three machine learning components 550, 553, and 556. This consensus also indicates a discrepancy or deviation from the first representation 579, which only indicates a single dog. Thus, in a same or similar manner to that explained in FIG. 1, the logic 113 may prompt feedback and/or confirmation as to whether the consensus is accurate. If the logic 113 receives an indication that the consensus is accurate, the logic 113 may prompt or request labeling or annotating of the first representation 579 to indicate that the emotion is anger, as illustrated in corrected representation 589, which includes two bounding boxes 590 and 591 corresponding to two separate annotations or indications of the two dogs.

Figure 6:
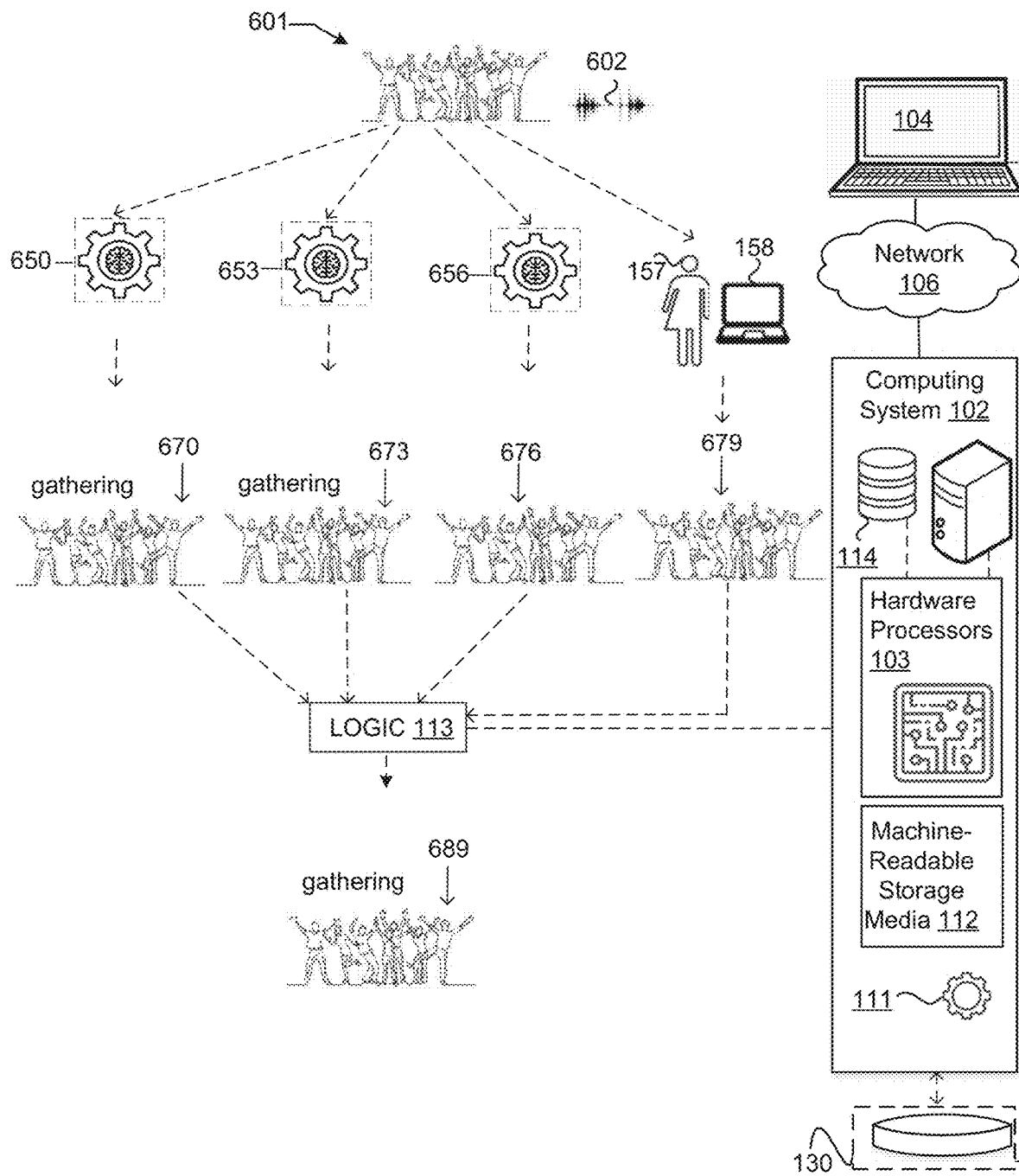
FIG. 6 illustrates an example implementation, in accordance with various examples, of a computing system that performs or prompts correction of any missing or erroneous annotations in media, such as an image and/or a video. The annotations in FIG. 6 may correspond to separate instances of objects.

FIG. 6 illustrates a further extension of an annotation or label indicative of an activity or event classification. In FIG. 6, an unstructured data entity 601 may be fed separately into machine learning components 650, 653, and 656, each of which may infer and annotate any one or more activities or events upon generating a second representation. Thus, in FIG. 6, instead of indicating classifications or types of objects within an unstructured data entity, as in FIG. 1, the machine learning components 650, 653, and 656 may have an objective or purpose of detecting, outputting, and/or indicating one or more activities or events within the unstructured data entity 601. These activities or events may be inferred by the machine learning components 650, 653, and 656 based on a context of multiple objects or entities within the unstructured data entity 601, and not only a single object or entity. Here, the machine learning components 650 and 653 may output second representations 670 and 673, which further annotate the unstructured data entity 601 to indicate a gathering. However, the machine learning component 656 may output a second representation 676 that is devoid of any indication of a gathering, and has no additional annotations compared to the unstructured data entity 601. Thus, the machine learning component 656 may have missed the identification of a gathering. Meanwhile, the human entity 157 and/or the computer entity 158 may also have missed annotating the unstructured data entity 601, as shown in a first representation 679. In other examples, the human entity 157 and/or the computer entity 158 may also have misidentified, rather than failed to label, the first representation. For example, the human entity 157 and/or the computer entity 158 may have indicated a "fight" instead of a "gathering." In such examples, just as in a scenario of a missing annotation, this erroneous annotation may also be rectified following the consensus and feedback mechanism described in FIG. 1.

In FIG. 6, a consensus among two of the three machine learning components is an inference or determination of a gathering. This consensus satisfies a majority of the three machine learning components 650, 653, and 656. This consensus also indicates a discrepancy or deviation from the first representation 679, which failed to annotate a gathering. Thus, in a same or similar manner to that explained in FIG. 1, the logic 113 may prompt feedback and/or confirmation as to whether the consensus is accurate. If the logic 113 receives an indication that the consensus is accurate, the logic 113 may prompt or request labeling or annotating of the first representation 679 to indicate a gathering, as illustrated in corrected representation 689.

Figure 7:
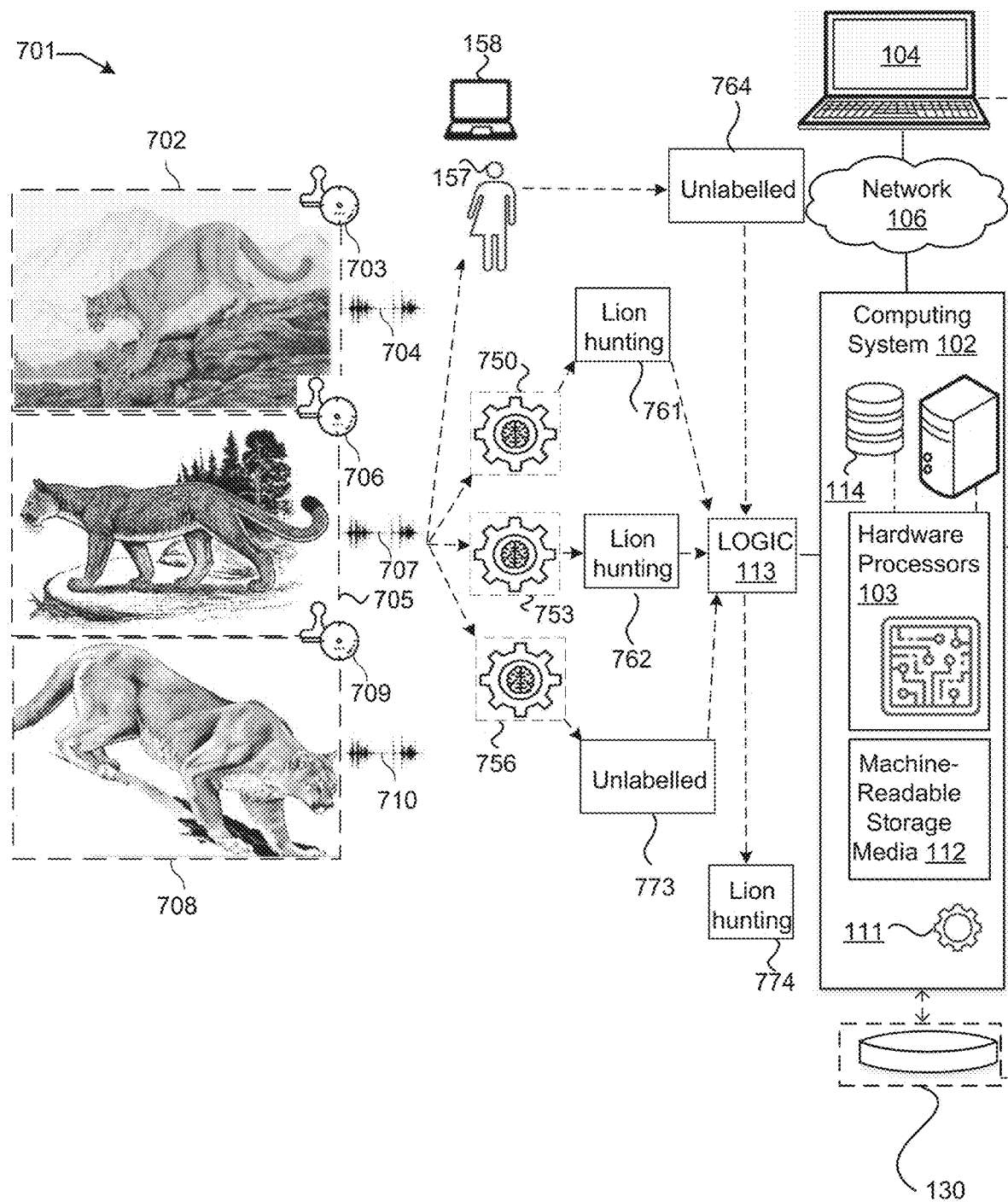
FIG. 7 illustrates an example implementation, in accordance with various examples, of a computing system that performs or prompts correction of any missing or erroneous annotations in media, such as an image and/or a video. The annotations in FIG. 7 may correspond to a classification, for example, of an event and/or an activity.

FIG. 7 illustrates a further extension of an annotation or label indicative of an entity or object and an activity in which the entity is engaging or participating in. In FIG. 7, an unstructured data entity 701 may be fed separately into machine learning components 750, 753, and 756, each of which may have an objective of identifying an entity and inferring a particular activity in which the entity is engaging or participating in. Thus, in FIG. 7, instead of indicating classifications or types of objects within an unstructured data entity, as in FIG. 1, the machine learning components 750, 753, and 756 may have an objective or purpose of detecting, outputting, and/or indicating one or more entities and one or more activities specific to those entities, or events within the unstructured data entity 701. The unstructured data entity may include multiple images, or frames of images or videos 702, 705, and 708, respective timestamps 703, 706, and 709 corresponding to the images or frames, and/or audio 704, 707, and 710 corresponding to the images or frames 702, 705, and 708. Here, the machine learning components 750 and 753 may output second representations 761 and 762, which further annotate the unstructured data entity 701 to indicate a lion hunting. However, the machine learning component 756 may output a second representation 773 that is devoid of any indication of a lion hunting, and has no additional annotations compared to the unstructured data entity 701. Thus, the machine learning component 756 may have missed the identification of a lion hunting. Meanwhile, the human entity 157 and/or the computer entity 158 may also have missed annotating the unstructured data entity 701, as shown in a first representation 764. In other examples, the human entity 157 and/or the computer entity 158 may also have misidentified, rather than failed to label, the first representation. For example, the human entity 157 and/or the computer entity 158 may have indicated a "lion swimming" instead of a "lion hunting." In such examples, just as in a scenario of a missing annotation, this erroneous annotation may also be rectified following the consensus and feedback mechanism described in FIG. 1.

In FIG. 7, a consensus among two of the three machine learning components is an inference or determination of a lion hunting. This consensus satisfies a majority of the three machine learning components 750, 753, and 756. This consensus also indicates a discrepancy or deviation from the first representation 764, which failed to annotate a lion hunting. Thus, in a same or similar manner to that explained in FIG. 1, the logic 113 may prompt feedback and/or confirmation as to whether the consensus is accurate. If the logic 113 receives an indication that the consensus is accurate, the logic 113 may prompt or request labeling or annotating of the first representation 764 to indicate a lion hunting, as illustrated in corrected representation 774.

Figure 8:
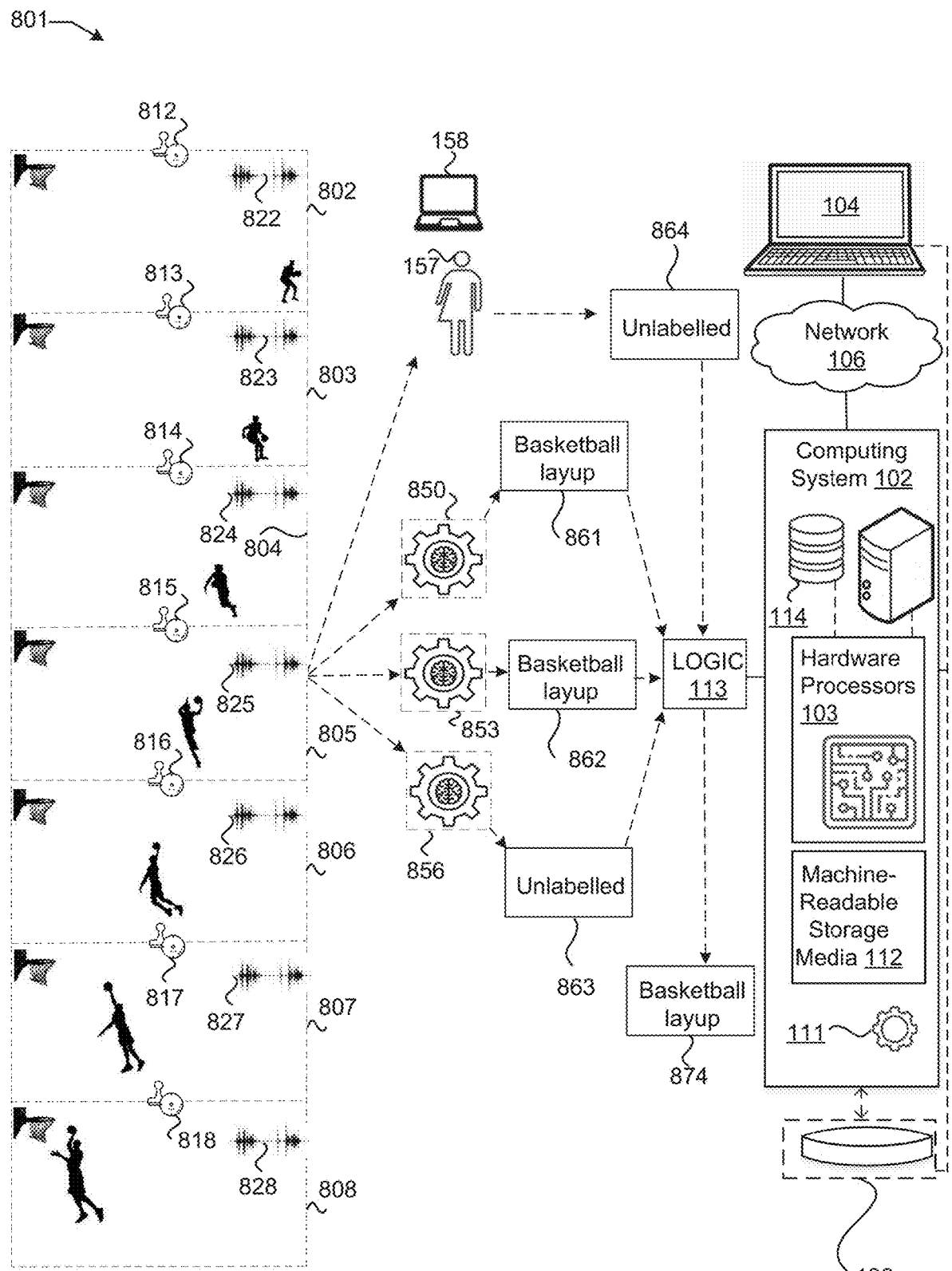
FIG. 8 illustrates an example implementation, in accordance with various examples, of a computing system that performs or prompts correction of any missing or erroneous annotations in media, such as an image, a series of images, and/or a video. The annotations in FIG. 8 may correspond to a classification, for example, of an event and/or an activity, and a description or a caption.

FIG. 8 illustrates a further extension of an annotation or label indicative of an activity and/or an event. In FIG. 8, an unstructured data entity 801 may be fed separately into machine learning components 850, 853, and 856, each of which may have an objective of identifying an activity and/or an event. Thus, in FIG. 8, instead of indicating classifications or types of objects within an unstructured data entity, as in FIG. 1, the machine learning components 850, 853, and 856 may have an objective or purpose of detecting, outputting, and/or indicating one or more activities or events within the unstructured data entity 801. The unstructured data entity 801 may include multiple images, or frames of images or videos 802, 803, 804, 805, 806, 807, and 808, respective timestamps 812, 813, 814, 815, 816, 817, and 818 corresponding to the images or frames, and/or audio 822, 823, 824, 825, 826, 827, and 828 corresponding to the respective images or frames 802, 803, 804, 805, 806, 807, and 808.

Here, the machine learning components 850 and 853 may output second representations 861 and 862, which further annotate the unstructured data entity 801 to indicate a specific event of a layup in a basketball activity. However, the machine learning component 856 may output a second representation 863 that is devoid of any indication of an event or an activity. Thus, the second representation 863 has no additional annotations compared to the unstructured data entity 801. The machine learning component 856 may have missed the identification of a basketball layup. Meanwhile, the human entity 157 and/or the computer entity 158 may also have missed annotating the unstructured data entity 801, as shown in a first representation 864. In other examples, the human entity 157 and/or the computer entity 158 may also have misidentified, rather than failed to label, the first representation. For example, the human entity 157 and/or the computer entity 158 may have indicated "dribbling" instead of a basketball layup. In such examples, just as in a scenario of a missing annotation, this erroneous annotation may also be rectified following the consensus and feedback mechanism described in FIG. 1.

In FIG. 8, a consensus among two of the three machine learning components is an inference or determination of a basketball layup. This consensus satisfies a majority of the three machine learning components 850, 853, and 856. This consensus also indicates a discrepancy or deviation from the first representation 864, which is devoid of an annotation of a basketball layup. Thus, in a same or similar manner to that explained in FIG. 1, the logic 113 may prompt feedback and/or confirmation as to whether the consensus is accurate. If the logic 113 receives an indication that the consensus is accurate, the logic 113 may prompt or request labeling or annotating of the first representation 864 to indicate a basketball layup, as illustrated in corrected representation 874.

Figure 9:
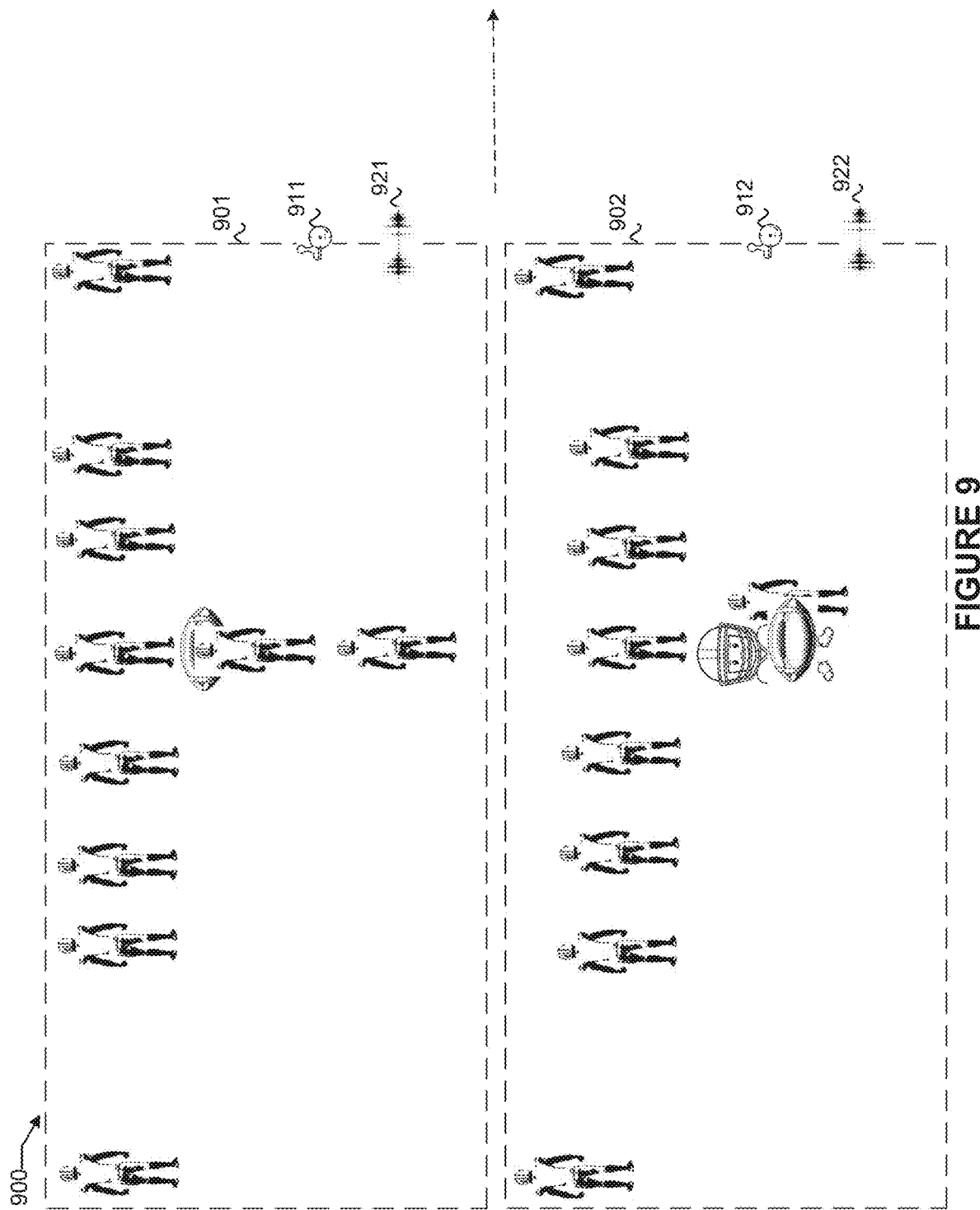
FIG. 9 illustrates an example implementation, in accordance with various examples, of a computing system that performs or prompts correction of any missing or erroneous annotations in media, such as an image, a series of images, and/or a video. The annotations in FIG. 9 may correspond to a classification, for example, of an event and/or an activity, and a description or a caption, involving multiple human entities.
Figure 9:
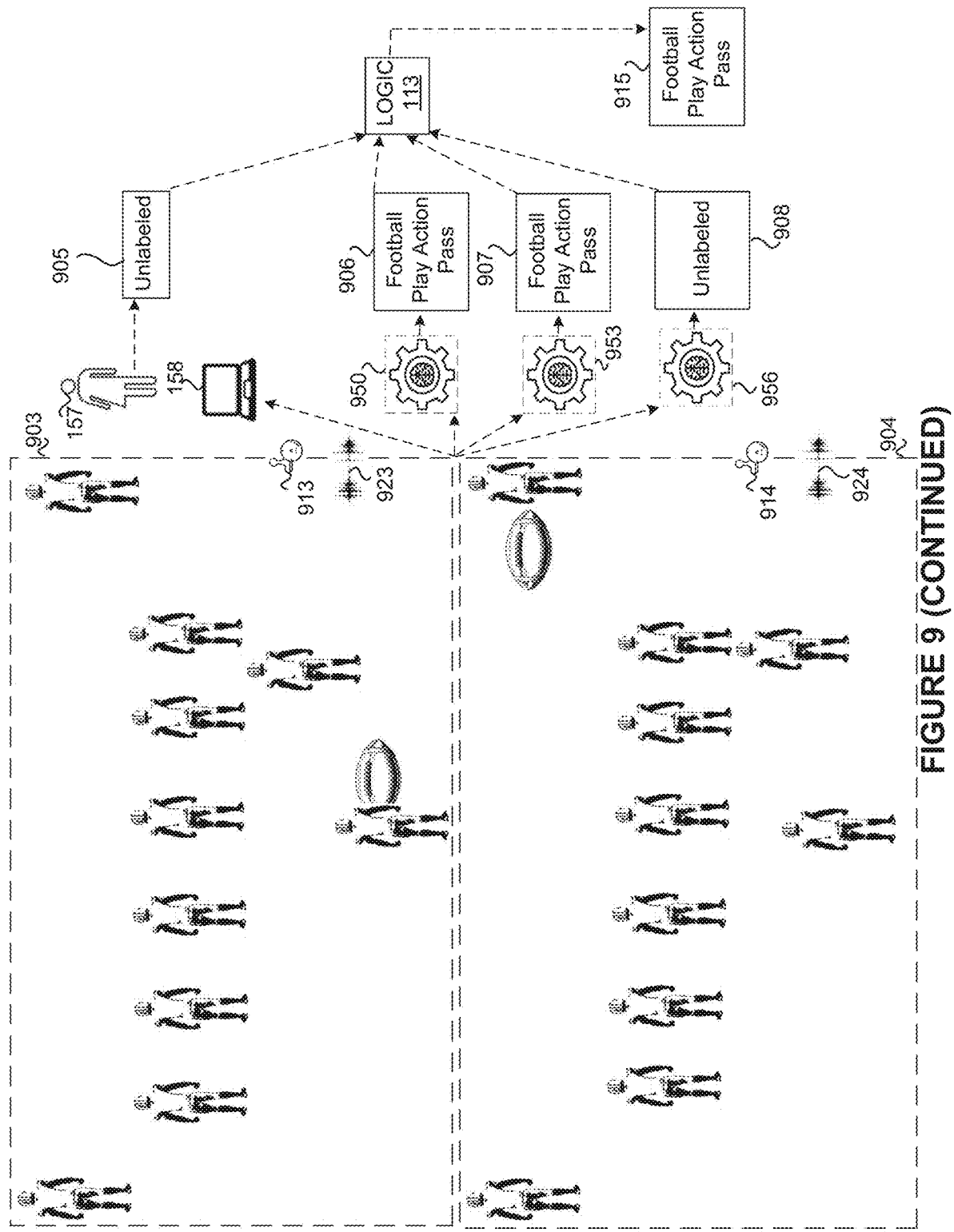

FIG. 9 illustrates a further extension of an annotation or label indicative of an activity and/or an event that includes multiple human entities. In FIG. 9, an unstructured data entity 900 may be fed separately into machine learning components 950, 953, and 956, each of which may have an objective of identifying an activity and/or an event. The unstructured data entity 900 may include multiple images, or frames of images or videos 901, 902, 903, and 904, respective timestamps 911, 912, 913, and 914 corresponding to the images or frames, and/or audio 921, 922, 923, and 924 corresponding to the respective images or frames 901, 902, 903, and 904.

Here, the machine learning components 950 and 953 may output second representations 906 and 907, which further annotate the unstructured data entity 900 to indicate a specific event of a play action pass in a football activity. However, the machine learning component 956 may output a second representation 908 that is devoid of any indication of an event or an activity. Thus, the second representation 908 has no additional annotations compared to the unstructured data entity 900. The machine learning component 956 may have missed the identification of a football play action pass. Meanwhile, the human entity 157 and/or the computer entity 158 may also have missed annotating the unstructured data entity 900, as shown in a first representation 905. In other examples, the human entity 157 and/or the computer entity 158 may also have misidentified, rather than failed to label, the first representation. For example, the human entity 157 and/or the computer entity 158 may have indicated "handoff" instead of a play action pass. In such examples, just as in a scenario of a missing annotation, this erroneous annotation may also be rectified following the consensus and feedback mechanism described in FIG. 1.

In FIG. 9, a consensus among two of the three machine learning components is an inference or determination of a basketball layup. This consensus satisfies a majority of the three machine learning components 950, 953, and 956. This consensus also indicates a discrepancy or deviation from the first representation 905, which failed to annotate a football play action pass. Thus, in a same or similar manner to that explained in FIG. 1, the logic 113 may prompt feedback and/or confirmation as to whether the consensus is accurate. If the logic 113 receives an indication that the consensus is accurate, the logic 113 may prompt or request labeling or annotating of the first representation 905 to indicate a football play action pass, as illustrated in corrected representation 915.

Figure 10:
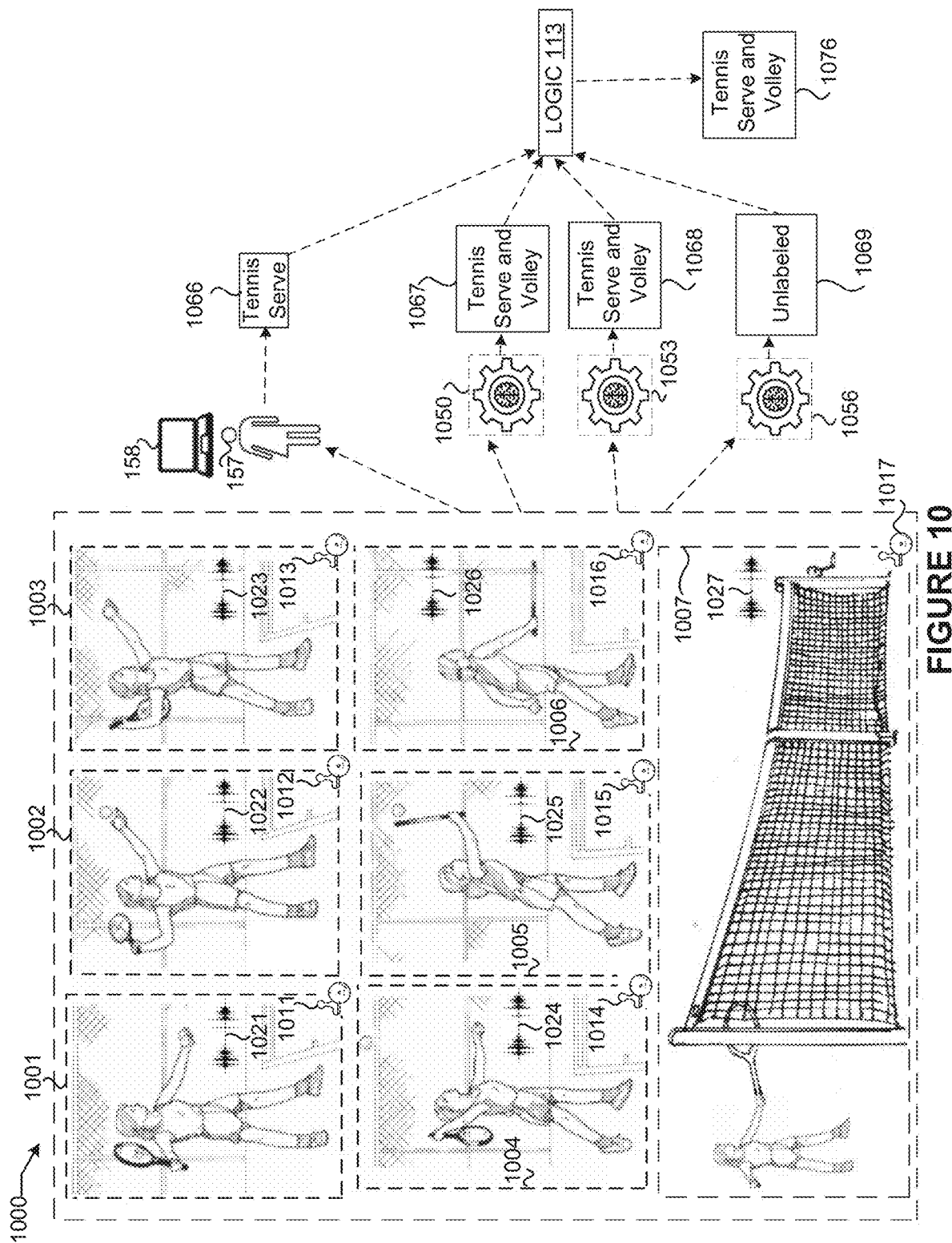
FIG. 10 illustrates an example implementation, in accordance with various examples, of a computing system that performs or prompts correction of any erroneous annotations in media, such as an image, a series of images, and/or a video. The annotations in FIG. 10 may correspond to a classification, for example, of an event and/or an activity, and a description or a caption.

FIG. 10 illustrates a further extension of an annotation or label indicative of an incomplete or erroneous classification that may be rectified as a result of a consensus among machine learning components. In FIG. 10, an unstructured data entity 1000 may be fed separately into machine learning components 1050, 1053, and 1056, each of which may have an objective of identifying an activity and/or an event. The unstructured data entity 1000 may include multiple images, or frames of images or videos 1001, 1002, 1003, 1004, 1005, 1006, and 1007, respective timestamps 1011, 1012, 1013, 1014, 1015, 1016, and 1017 corresponding to the images or frames, and/or audio 1021, 1022, 1023, 1024, 1025, 1026, and 1027 corresponding to the respective images or frames 1001, 1002, 1003, 1004, 1005, 1006, and 1007.

Here, the machine learning components 1050 and 1053 may output second representations 1067 and 1068, which further annotate the unstructured data entity 1000 to indicate a specific event of a serve and volley in a tennis activity. However, the machine learning component 1056 may output a second representation 1069 that is devoid of any indication of an event or an activity. Thus, the second representation 1069 has no additional annotations compared to the unstructured data entity 1000. The machine learning component 1056 may have missed the identification of a tennis serve and volley. Meanwhile, the human entity 157 and/or the computer entity 158 may also have erroneously annotated the unstructured data entity 1000 as merely a tennis serve instead of a tennis serve and volley, as shown in a first representation 1066. Here, just as in a scenario of a missing annotation, this erroneous annotation may also be rectified following the consensus and feedback mechanism described in FIG. 1.

In FIG. 10, a consensus among two of the three machine learning components is an inference or determination of a tennis serve and volley. This consensus satisfies a majority of the three machine learning components 1050, 1053, and 1056. This consensus also indicates a discrepancy or deviation from the first representation 1066, which indicated a tennis serve. Thus, in a same or similar manner to that explained in FIG. 1, the logic 113 may prompt feedback and/or confirmation as to whether the consensus is accurate. If the logic 113 receives an indication that the consensus is accurate, the logic 113 may prompt or request labeling or annotating of the first representation 1066 to indicate a tennis serve and volley, as illustrated in corrected representation 1076.

Figure 11:
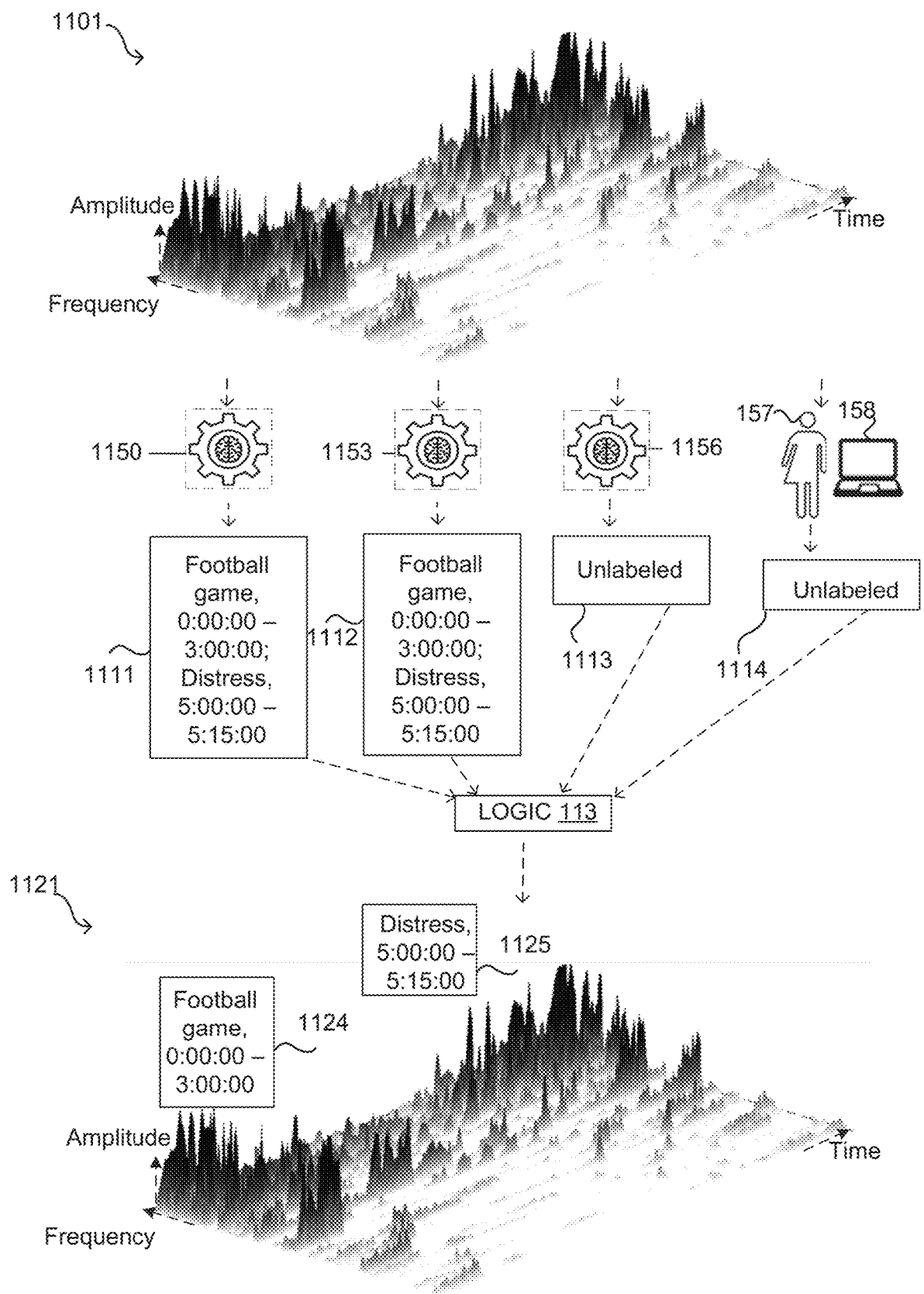
FIG. 11 illustrates an example implementation, in accordance with various examples, of a computing system that performs or prompts correction of any missing or erroneous annotations in media, such as an audio file or other manifestation. The annotations in FIG. 11 may correspond to a classification, for example, of an event and/or an activity, and/or an inferred emotion or emotional state.

FIG. 11 illustrates a further extension of an annotation or label indicative of a missing classification in an audio file that may be rectified as a result of a consensus among machine learning components. In FIG. 11, an unstructured data entity 1101 may be fed separately into machine learning components 1150, 1153, and 1156, each of which may have an objective of identifying an activity, an event, and/or an emotional state from audio, which may be manifested in a form of an audio file. The unstructured data entity 1101 may include an audio manifestation such as a spectrogram, which has axes of time, amplitude, and frequency. In particular, the machine learning components 1150 and 1153 may output respective second representations 1111 and 1112, which further annotate the unstructured data entity 1101 to indicate a specific event of a football game occurring during a portion of the unstructured data entity 1101, as well as indicating an emotional state of distress during another time period within the unstructured data entity 1101. However, the machine learning component 1156 may output a second representation 1113 that is devoid of any indication of an event or an activity. Thus, the second representation 1113 has no additional annotations compared to the unstructured data entity 1101. The machine learning component 1156 may have missed the identification of a football game and of a distressed emotional state. Meanwhile, the human entity 157 and/or the computer entity 158 may also have missed an inference or annotation of a football game and of a distressed emotional state, as shown in a first representation 1114. Here, in a scenario of a missing or erroneous annotation of the first representation 1114, this missing or erroneous annotation may also be rectified following the consensus and feedback mechanism described in FIG. 1.

In FIG. 11, a consensus among two of the three machine learning components is an inference or determination of a football game and a distressed emotional state at two different time periods. Each detection (e.g., football game, distress) may be evaluated individually to determine a consensus for that detection). Thus, hypothetically, if half of machine learning components only detect a football game while an other half of the machine learning components only detect distress, meaning that no machine learning component detects both a football game and distress, a consensus nonetheless exists for detection of the football game, and a separate consensus exists for detection of distress. This consensus satisfies a majority of the three machine learning components 1150, 1153, and 1156. This consensus also indicates a discrepancy or deviation from the first representation 1114, which is devoid of any annotations. Thus, in a same or similar manner to that explained in FIG. 1, the logic 113 may prompt feedback and/or confirmation as to whether the consensus is accurate. If the logic 113 receives an indication that the consensus is accurate, the logic 113 may prompt or request labeling or annotating of the first representation 1114 to indicate a football game and a distressed emotional state, as illustrated in corrected representation 1121, which includes further annotations 1124 and 1125 indicating a football game and a distressed emotional state.

Figure 12:
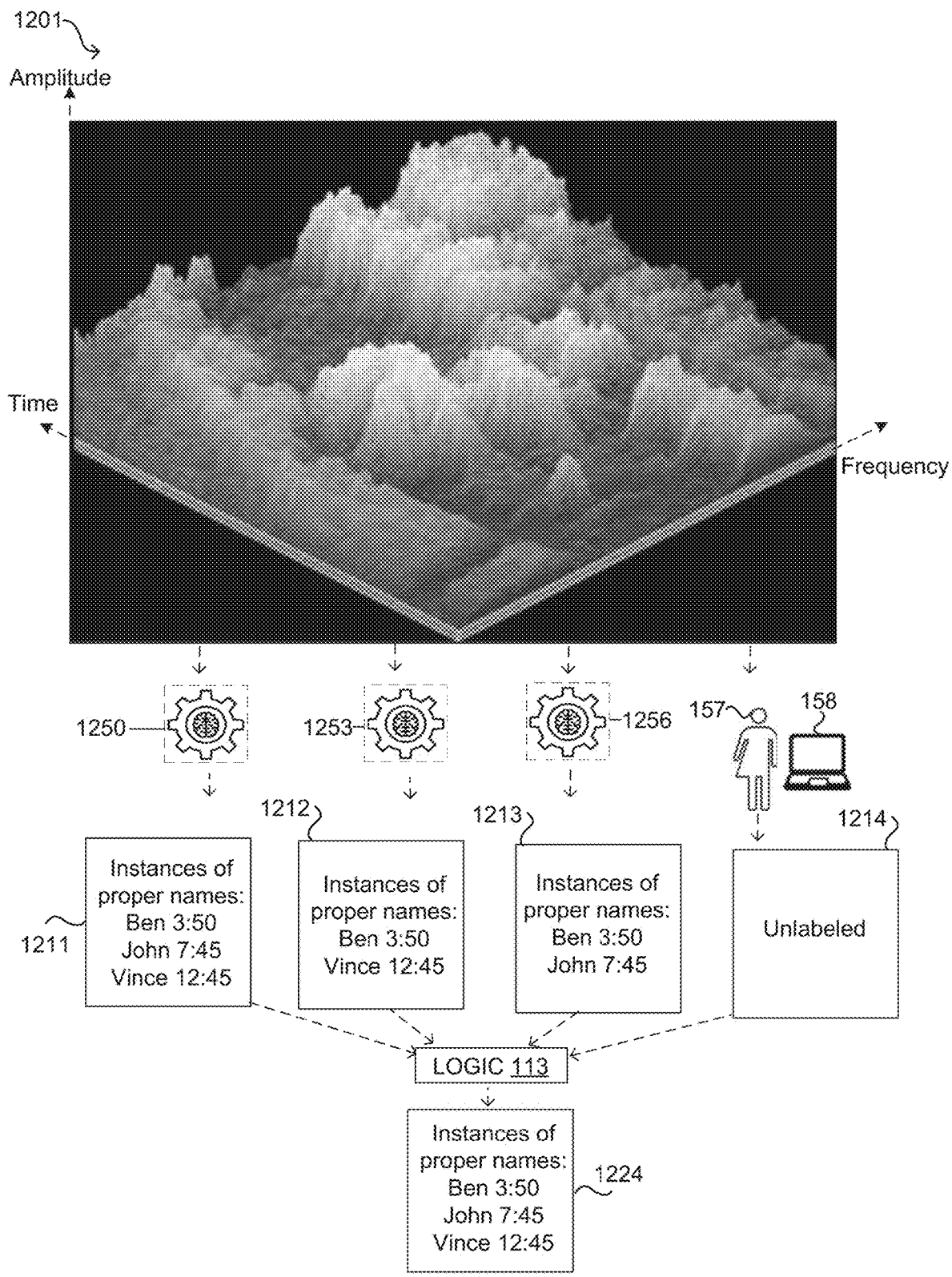
FIG. 12 illustrates an example implementation, in accordance with various examples, of a computing system that performs or prompts correction of any missing or erroneous annotations in media, such as an audio file or other manifestation. The annotations in FIG. 12 may correspond to a classification.

Next, in FIG. 12, instead of detecting events and/or emotional states within an audio, as illustrated in FIG. 11, a purpose of machine learning components and of annotations may be directed to uncovering all instances of proper names within an audio. As a specific illustrative example, an audio file may include a phone conversation, which may be transcribed into a phone log. In particular, an unstructured data entity 1201 manifested as an audio file, which may include a spectrogram, may be fed separately into machine learning components 1250, 1253, and 1256, each of which may have an objective of identifying any instances at which particular entities under some classification occur. Here, the machine learning component 1250 may output a second representation 1211 that enumerates instances of proper names, Ben, John, and Vince, and respective times at which they occur within the unstructured data entity 1201. The machine learning component 1253 may output a second representation 1212 that enumerates instances of proper names, Ben and Vince, and respective times at which they occur within the unstructured data entity 1201. The machine learning component 1256 may output a second representation 1213 that enumerates instances of proper names, Ben and John, and respective times at which they occur within the unstructured data entity 1201. Thus, taking each name or entity separately, three out of three machine learning components enumerated or outputted "Ben," two out of the three machine learning components enumerated or outputted "John," and two out of the three machine learning components enumerated or outputted "Vince." The consensus may be determined for each name individually, rather than a group of names collectively.

Meanwhile, the human entity 157 and/or the computer entity 158 may also have missed an inference or annotation of any proper names, as shown in a first representation 1214. Here, in a scenario of a missing or erroneous annotation of the first representation 1214, this missing or erroneous annotation may also be rectified following the consensus and feedback mechanism described in FIG. 1.

In FIG. 12, a consensus represents an inference or determination of the proper names Ben, John, and Vince, because at least two of the three machine learning components inferred or determined each of the three aforementioned names individually. Thus, even though the collective inference of all names detected differed between the machine learning components, for example, the machine learning component 1253 failed to detect "John" while the machine learning component 1256 failed to detect "Vince," the machine learning components 1250, 1253, and 1256 have a consensus regarding each of the names individually. This consensus also indicates a discrepancy or deviation from the first representation 1214, which is devoid of any inferences of proper names. Thus, in a same or similar manner to that explained in FIG. 1, the logic 113 may prompt feedback and/or confirmation as to whether the consensus is accurate. If the logic 113 receives an indication that the consensus is accurate, the logic 113 may prompt or request labeling or annotating of the first representation 1214 to indicate the three proper names upon which the machine learning components 1250, 1253, and 1256 have established a consensus. A corrected representation 1224 thus includes annotations of Ben, John, and Vince as proper names.

Figure 13:
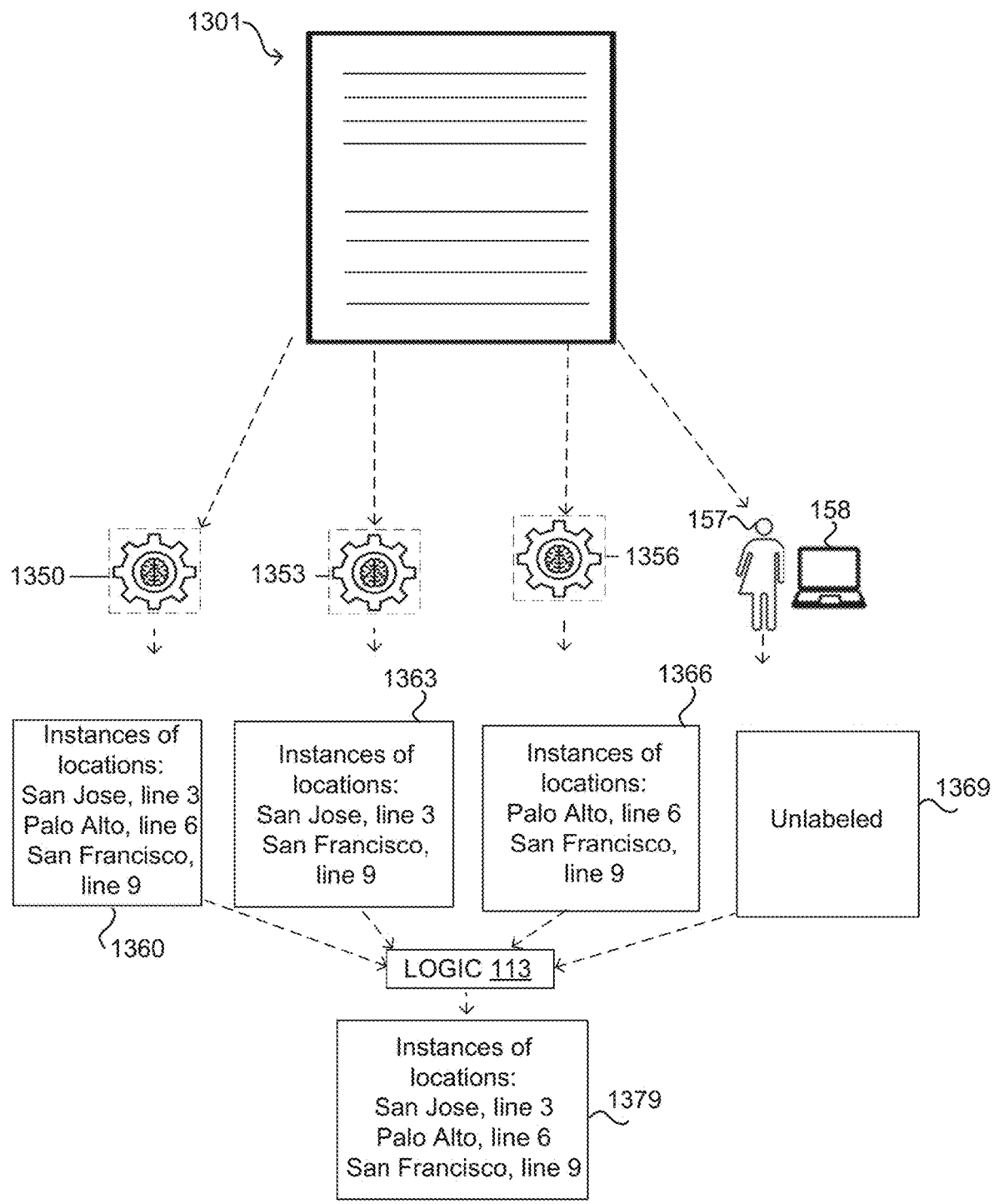
FIG. 13 illustrates an example implementation, in accordance with various examples, of a computing system that performs or prompts correction of any missing or erroneous annotations in media, such as an unstructured text. The annotations in FIG. 13 may correspond to an inference, for example, of an emotion or emotional state.

Detection of particular classifications such as proper names may be implemented not only in audio but also within any unstructured data such as within images, video, or unstructured text. As illustrated in FIG. 13, an unstructured data entity 1301, which may include unstructured text, may be fed into machine learning components 1350, 1353, and 1356, each of which may have an objective of identifying any instances of locations. Unstructured text may include text in non-tabular format. In particular, the machine learning component 1350 may output a second representation 1360, which further annotates the unstructured data entity 1301 to indicate instances of locations of San Jose, Palo Alto, and San Francisco within particular lines or locations of the unstructured data entity 1301. Meanwhile, the machine learning component 1353 may output a second representation 1363, which further annotates the unstructured data entity 1301 to indicate instances of locations of San Jose and San Francisco within particular lines or locations of the unstructured data entity 1301. The machine learning component 1356 may output a second representation 1366, which further annotates the unstructured data entity 1301 to indicate instances of locations of Palo Alto and San Francisco within particular lines or locations of the unstructured data entity 1301.

Thus, taking each name or entity separately, three out of three machine learning components enumerated or outputted "San Francisco," two out of the three machine learning components enumerated or outputted "San Jose," and two out of the three machine learning components enumerated or outputted "Palo Alto." The consensus may be determined for each location individually, rather than a group of locations collectively.

Meanwhile, the human entity 157 and/or the computer entity 158 may also have missed an inference or annotation of any instances of locations, as shown in a first representation 1369. Here, in a scenario of a missing or erroneous annotation of the first representation 1369, this missing or erroneous annotation may also be rectified following the consensus and feedback mechanism described in FIG. 1.

In FIG. 13, a consensus is an inference or determination of the locations San Jose, Palo Alto, and San Francisco, because at least two of the three machine learning components inferred or determined each of the three aforementioned locations individually. Thus, even though the collective inference of all locations detected differed between the machine learning components, for example, the machine learning component 1353 failed to detect "Palo Alto" while the machine learning component 1356 failed to detect "San Jose," the machine learning components 1350, 1353, and 1356 have a consensus regarding each of the names individually. This consensus also indicates a discrepancy or deviation from the first representation 1369, which is devoid of any inferences of locations. Thus, in a same or similar manner to that explained in FIG. 1, the logic 113 may prompt feedback and/or confirmation as to whether the consensus is accurate. If the logic 113 receives an indication that the consensus is accurate, the logic 113 may prompt or request labeling or annotating of the first representation 1369 to indicate the three locations upon which the machine learning components 1350, 1353, and 1356 have established a consensus. A corrected representation 1379 thus includes annotations of San Jose, Palo Alto, and San Francisco as proper names.

Figure 14:
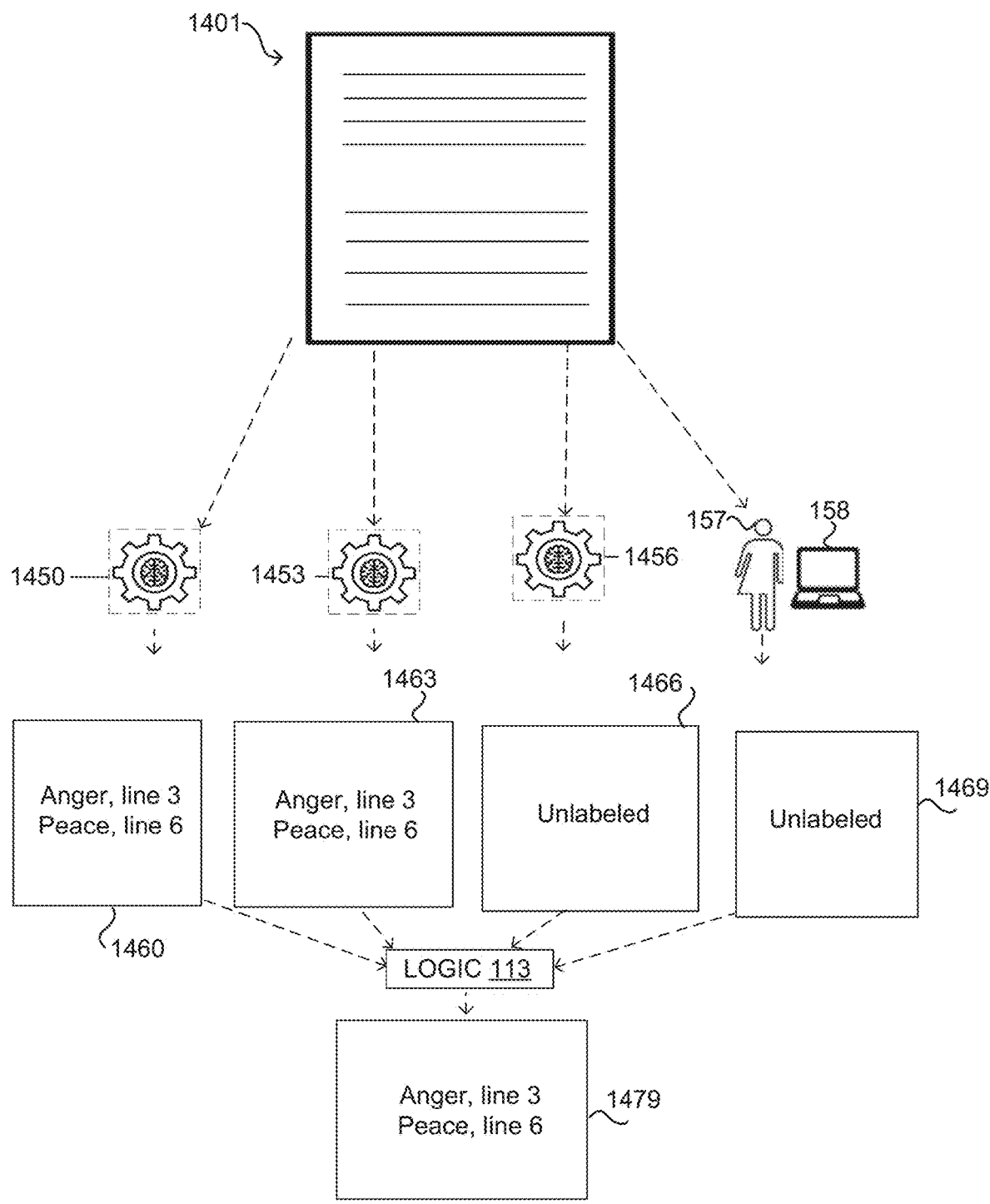
FIG. 14 illustrates an example implementation, in accordance with various examples, of a computing system that performs or prompts correction of any missing or erroneous annotations in media, such as an unstructured text. The annotations in FIG. 14 may correspond to an inference, for example, of an emotion or emotional state.

FIG. 14 illustrates annotations of emotional states within unstructured text. As illustrated in FIG. 14, an unstructured data entity 1401, which may include unstructured text, may be fed into machine learning components 1450, 1453, and 1456, each of which may have an objective of identifying any instances of emotional states within the unstructured data entity 1401. In particular, the machine learning components 1450 and 1453 may output respective second representations 1460 and 1463, which further annotates the unstructured data entity 1401 to indicate emotional states of anger and peace within the unstructured data entity 1401. However, the machine learning component 1456 may output a second representation 1466 that is devoid of any indication of an emotion. Thus, the second representation 1466 has no additional annotations compared to the unstructured data entity 1401. The machine learning component 1456 may have missed the identifications of emotional states. Meanwhile, the human entity 157 and/or the computer entity 158 may also have missed an inference or annotation of a football game and of a distressed emotional state, as shown in a first representation 1469. Here, in a scenario of a missing or erroneous annotation of the first representation 1469, this missing or erroneous annotation may also be rectified following the consensus and feedback mechanism described in FIG. 1.

In FIG. 14, a consensus among two of the three machine learning components is an inference or determination of anger and of peace at two different time periods. This consensus satisfies a majority of the three machine learning components 1450, 1453, and 1456. This consensus also indicates a discrepancy or deviation from the first representation 1469, which is devoid of any annotations. Thus, in a same or similar manner to that explained in FIG. 1, the logic 113 may prompt feedback and/or confirmation as to whether the consensus is accurate. If the logic 113 receives an indication that the consensus is accurate, the logic 113 may prompt or request labeling or annotating of the first representation 1469 to indicate anger in one portion of the unstructured data entity 1401 and peace at a different portion of the unstructured data entity 1401, as illustrated in corrected representation 1479.

Figure 15:
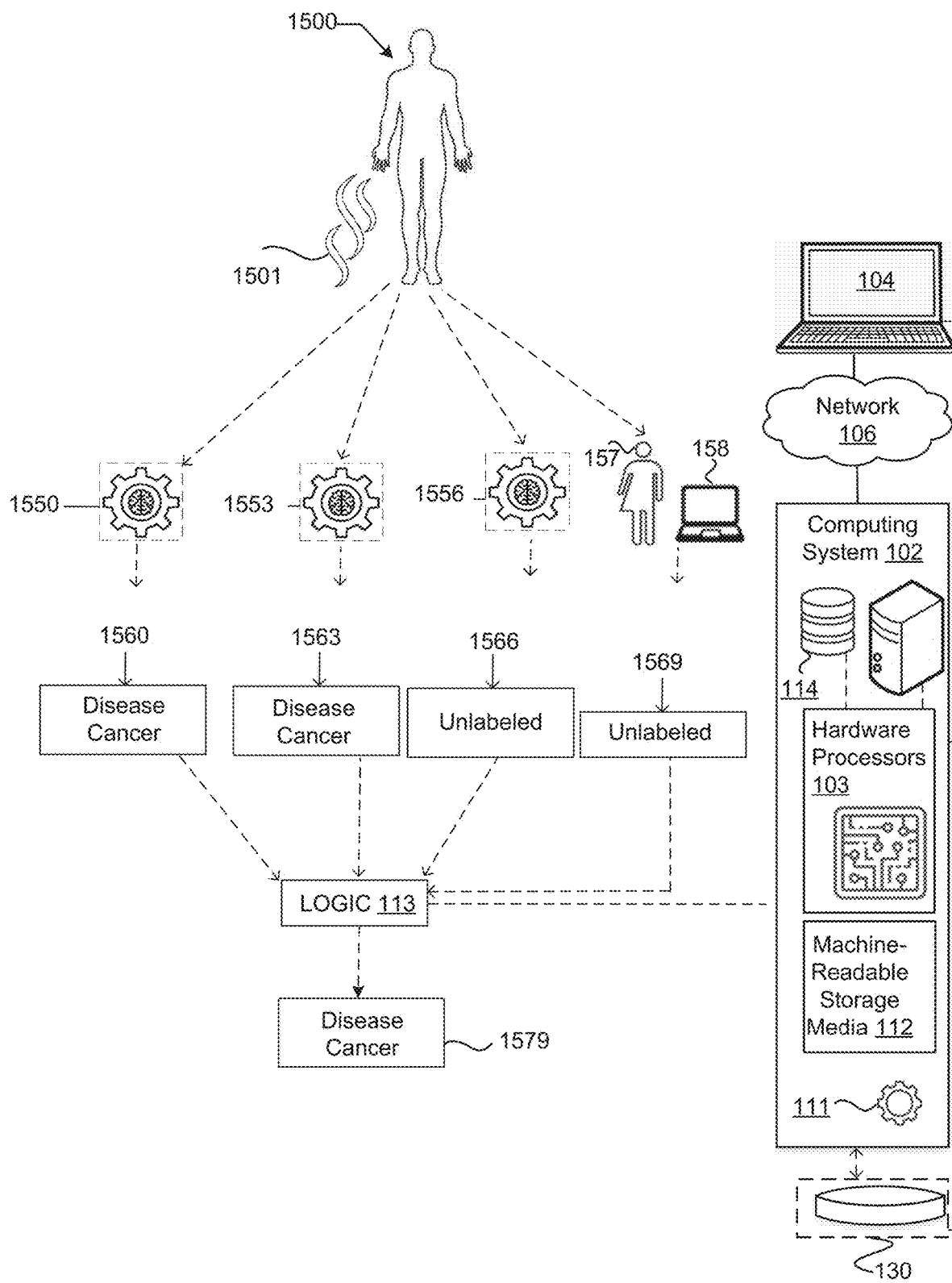
FIG. 15 illustrates an example implementation, in accordance with various examples, of a computing system that performs or prompts correction of any missing or erroneous annotations in media, such as scent-enabled digital media or other digital files that encompass scent. The annotations in FIG. 15 may correspond to an inference, for example, of a disease.

Next, FIG. 15 illustrates a further extension of an annotation or label indicative of a missing classification in a digital smell or scent entity 1501, which may be from an object 1500. For example, the digital smell or scent entity 1501 may include a file that may incorporate smells from a human entity, such as, from sebum or other substance of the human entity. In FIG. 15, the digital smell or scent entity 1501 may be fed separately into machine learning components 1550, 1553, and 1556, each of which may have an objective of identifying, inferring, or diagnosing a disease, emotional, activity, and/or other state from the digital smell or scent entity 1501. In some examples, the machine learning components 1550, 1553, and 1556 may have a further objective of prescriptive analysis, such as recommending a course of action in response to the diagnosis. In particular, the machine learning components 1550 and 1553 may output respective second representations 1560 and 1563, which further annotate the digital smell or scent entity 1501 to indicate a specific disease state of cancer. However, the machine learning component 1556 may output a second representation 1566 that is devoid of any indication of a disease. Thus, the second representation 1566 has no additional annotations compared to the digital smell or scent entity 1501. The machine learning component 1556 may have missed the identification of a cancer disease state. Meanwhile, the human entity 157 and/or the computer entity 158 may also have missed an inference or annotation of a cancer disease state, according to a smell or a scent, as shown in a first representation 1569. Here, in a scenario of a missing or erroneous annotation of the first representation 1569, this missing or erroneous annotation may also be rectified following the consensus and feedback mechanism described in FIG. 1.

In FIG. 15, a consensus among two of the three machine learning components is an inference or determination of a cancer disease state based on a smell or a scent. This consensus satisfies a majority of the three machine learning components 1550, 1553, and 1556. This consensus also indicates a discrepancy or deviation from the first representation 1569, which is devoid of any annotations. Thus, in a same or similar manner to that explained in FIG. 1, the logic 113 may prompt feedback and/or confirmation as to whether the consensus is accurate. If the logic 113 receives an indication that the consensus is accurate, the logic 113 may prompt or request labeling or annotating of the first representation 1569 to indicate a cancer disease state, as illustrated in corrected representation 1579.

Figure 16:
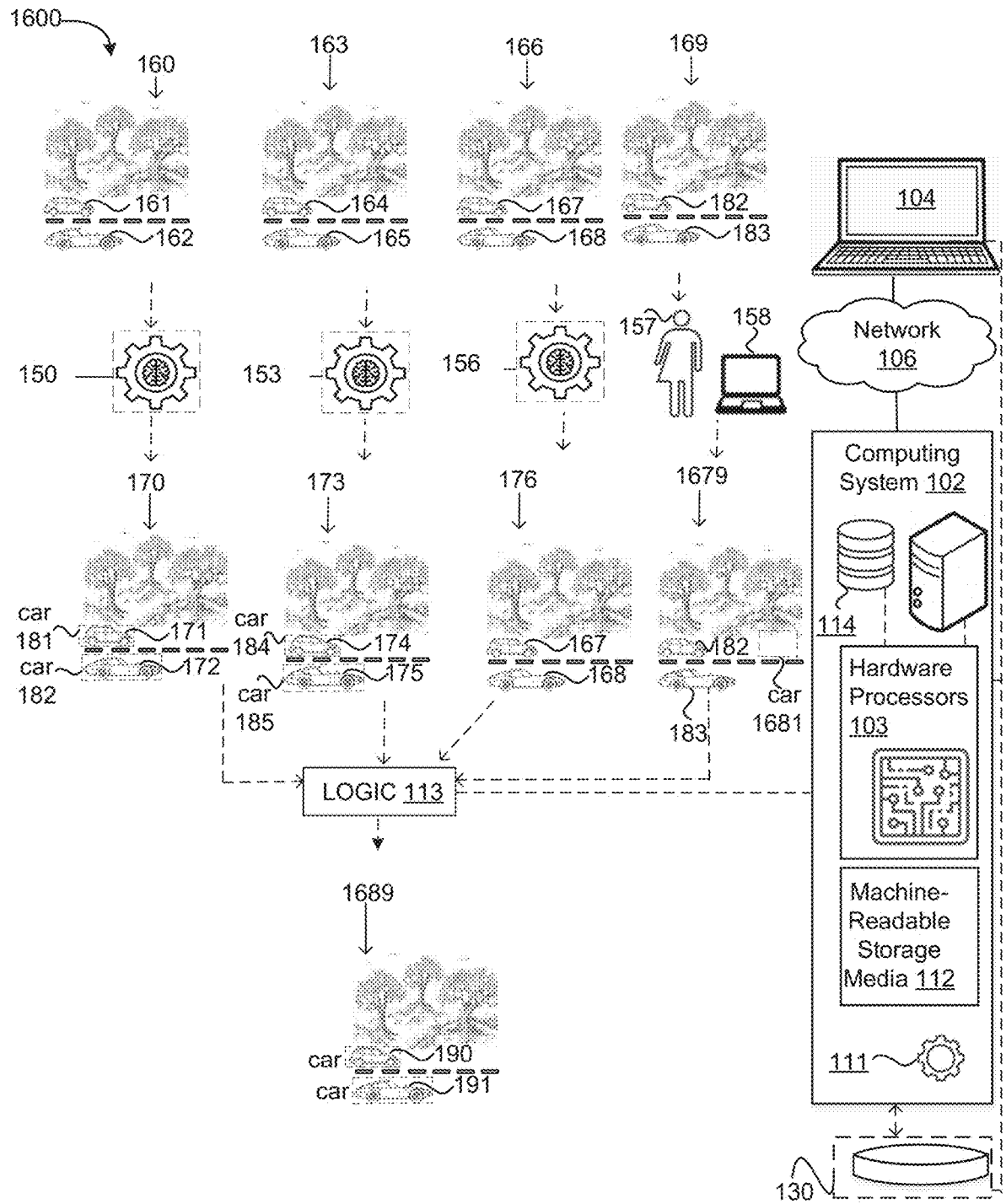
FIG. 16 illustrates an example implementation, in accordance with various examples, of a computing system that performs or prompts correction of any erroneous annotations in media, such as an image and/or a video. The annotations in FIG. 16 may correspond to an object.

Next, FIG. 16 illustrates a situation that erroneously adding an annotation at a particular position, location, and/or time, when no annotation should have existed, may be rectified based on a consensus among machine learning components. Details previously described in FIG. 1 also apply to FIG. 16, except, that a first representation 1679 generated by the human entity 157 and/or the computer entity 158 may include a bounding box 1681 having a label of "car." However, the three machine learning components 150, 153, and 156 have outputted second representations 170, 173, and 176 that do not include any bounding box at that corresponding location. Thus, the three machine learning components have established a consensus that no car exists at that corresponding location. Thus, the logic 113 may prompt feedback and/or confirmation as to whether the consensus is accurate. If the logic 113 receives an indication that the consensus is accurate, the logic 113 may prompt or request labeling or annotating of the first representation 1679 to indicate an absence of a car and remove the bounding box 1681, as illustrated in corrected representation 1689. The corrected representation 1689 may also include annotations 190 and 191 corresponding to consensus of objects that exist according to the machine learning components 150, 153, and 156.

FIG. 17 illustrates downstream implementations following the labeling or annotation of first representations of an unstructured data entity, which may initially have been manually and/or computer labeled. The labeling or annotation of the first representations may, as explained with respect to FIGS. 1-16, be based on consensus among machine learning components which also annotate unstructured data entities to generate second representations. In FIG. 17, a corrected representation 1701 which includes annotations 1702 may be implemented as any of the corrected representations 189, 386, 479, 589, 689, 774, 874, 915, 1036, 1121, 1224, 1379, 1479, 1579, or 1689 in FIGS. 1 and 3-16, respectively.

This corrected representation 1701 may be fed into machine learning components, for example, the same machine learning components illustrated in FIGS. 1-16 or different machine learning components, to train, validate, and/or test the machine learning components. The training of the machine learning components may be iterative, and encompass multiple stages or iterations. For example, a first stage or iteration may train a machine learning component while a second stage may include examples or a corpus of training data corresponding to examples or situations in which the machine learning component had highest uncertainty rates or error rates, and/or in which a consensus of machine learning components had lowest confidence scores and/or diverged the most, compared to other examples. Additionally, if any detections were outside of certain thresholds, then additional training may be conducted with respect to those situations on the machine learning components, and/or additional outputs may be generated from the machine learning components. Thus, subsequent iterations or stages of training may further improve or confirm outputs generated by machine learning components.

As a result of training of the machine learning components (e.g., machine learning component(s) 1703) and outputs generated from the machine learning components, certain downstream actions may be triggered, such as, performing navigation 1710, additional monitoring 1715, transmitting and/or writing information to a different computing system 1720, for example, via an API 1721, and/or maintenance or other physical operations 1722. As an example of the additional monitoring 1715, assume that the machine learning component(s) 1703 may infer or determine attributes or parameters associated with different wireless or wired networks, such as bandwidth, speed, and/or throughput of different wireless networks, or devices or machines associated with different wireless networks. If one, or any of, the attributes or parameters fall outside of operating ranges or thresholds, then the logic 113, or a different computing system, may trigger an alert, and/or may initiate additional monitoring or recording of the attributes or parameters, and/or of different attributes or parameters such as delay, packet loss, or jitter. In other examples, the logic 113 may, additionally or alternatively, trigger monitoring or recording of other entity types, such as, other network devices or client devices that may be affected by the attributes or parameters. This monitoring or recording of other entity types may be delegated to a different processor. In other examples, a downstream action may include a transmission or presentation of information, an alert, and/or a notification to the to the computing device 120 and/or to other devices. The information may include indications of which attributes or parameters fall outside of operating ranges or thresholds, or reasons that an alert was triggered, and/or one or more timestamps corresponding to an originating or creation time of underlying data that caused the triggering of the alert. Alternatively, an alert may be triggered using a predicted time at which an attribute or parameter may be predicted to fall outside of an operating range or threshold.

In yet other examples, a downstream action may entail the API 111 interfacing with or calling the API 1721 of the different computing system 1720. For example, the different computing system 1720 may perform modification of data. The modification may encompass creating, editing, or removing entities or links, and/or adjusting attributes or parameters that are falling outside of an operating range or threshold, through some electronic or physical operation.

Figure 18:
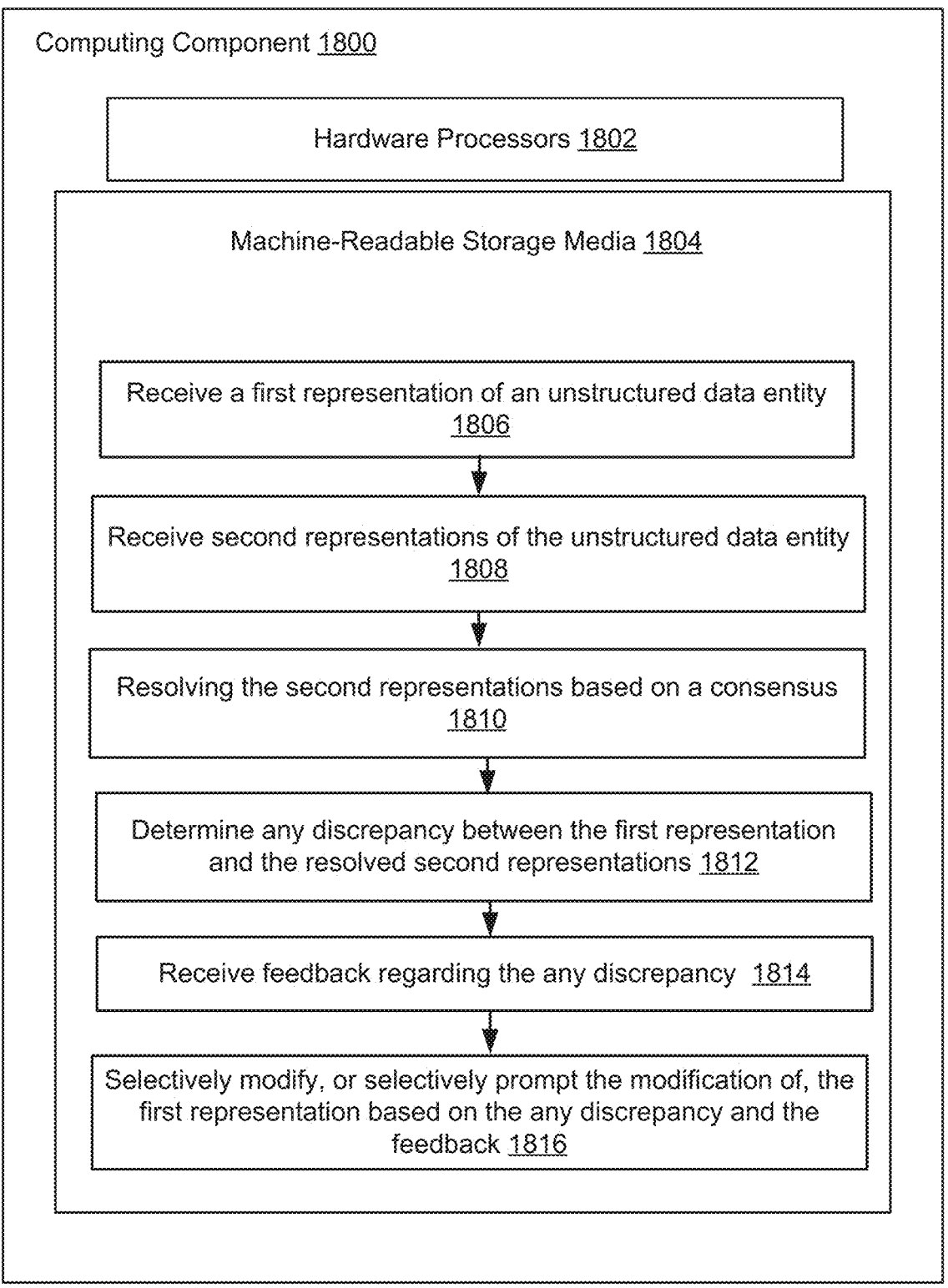
FIG. 18 illustrates a flowchart of an example method consistent with FIGS. 1-17, embodied in a computing component.

FIG. 18 illustrates a computing component 1800 that includes one or more hardware processors 1802 and machine-readable storage media 1804 storing a set of machine-readable/machine-executable instructions that, when executed, cause the hardware processor(s) 1802 to perform an illustrative method of monitoring and/or initiating of downstream actions. The computing component 1800 may be implemented as the computing system 102 of FIG. 1. The hardware processors 1802 may be implemented as the hardware processors 103 of FIG. 1. The machine-readable storage media 1804 may be implemented as the machine-readable storage media 112 of FIG. 1, and may include suitable machine-readable storage media described in FIG. 19.

At step 1806, the hardware processor(s) 1802 may execute machine-readable/machine-executable instructions stored in the machine-readable storage media 1804 to receive a first representation (e.g., 179, 360, 469, 579, 679, 764, 864, 905, 1066, 1114, 1214, 1369, 1469, 1569, or 1679) of an unstructured data entity (e.g., 160, 301, 401, 501, 601, 701, 801, 900, 1000, 1101, 1201, 1301, 1401, 1501). This first representation may include any indication of a detection and may be part of a corpus. This first representation may be manually labeled and/or computer labeled, separate from the processing by machine learning components. This first representation may be checked to ensure accuracy of annotations, against a consensus of second representations which have been processed by machine learning components.

At step 1808, the hardware processor(s) 1802 may execute machine-readable/machine-executable instructions stored in the machine-readable storage media 1804 to receive second representations (e.g., 170, 173, 176, 370, 373, 376, 460, 463, 466, 570, 573, 576, 670, 673, 676, 761, 762, 773, 861, 862, 863, 906, 907, 908, 1067, 1068, 1069, 1111, 1112, 1113, 1211, 1212, 1213, 1360, 1363, 1366, 1460, 1463, 1466, 1560, 1563, 1566) of the unstructured data entity. These second representations may have been processed and/or analyzed by machine learning components to infer, predict, or determine any detections and to annotate such detections.

At step 1810, the hardware processor(s) 1802 may execute machine-readable/machine-executable instructions stored in the machine-readable storage media 1804 to resolve the second representations based on a consensus. This consensus may be based on a majority or a plurality of machine learning components agreeing upon a detection within the second representations. This consensus may also be based on a most frequently occurring detection at a particular location, position, time, and/or frame. For example, in FIG. 1, the machine learning components 150 and 153 establish a consensus, within the respective second representations 170 and 173, regarding a presence and location of two cars. Even though the machine learning component 156 failed to detect a presence and location of two cars, a consensus of two out of three machine learning models was nonetheless established.

At step 1812, the hardware processor(s) 1802 may execute machine-readable/machine-executable instructions stored in the machine-readable storage media 1804 to determine any discrepancy between the first representation and the resolved second representations. The any discrepancy may include any difference in an existence or an absence of the detection, in a relative position of the detection, or in a type or a classification of the detection.

At step 1814, the hardware processor(s) 1802 may execute machine-readable/machine-executable instructions stored in the machine-readable storage media 1804 to receive feedback regarding the any discrepancy. This feedback may be from a human entity to confirm an accuracy or a veracity of the resolved second representations.

At step 1816, the hardware processor(s) 1802 may execute machine-readable/machine-executable instructions stored in the machine-readable storage media 1804 to selectively modify, or selectively prompt the modification of, the first representation based on the any discrepancy and the feedback. In such a manner, the first representation may be corrected into a corrected representation (e.g., 189, 386, 479, 589, 689, 774, 874, 915, 1076, 1121, 1224, 1379, 1479, 1579, 1689), in which any annotations match those of the resolved second representations, if the confirmation of the accuracy or veracity of the resolved second representations is received. However, if no confirmation is received, or if the feedback indicates that the resolved second representations are inaccurate, then the first representation is left unchanged.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software. Operating systems control and schedule computer processes for execution, perform memory management, provide file system, networking, I/O services, and provide a user interface functionality, such as a graphical user interface ("GUI"), among other things.

Figure 19:
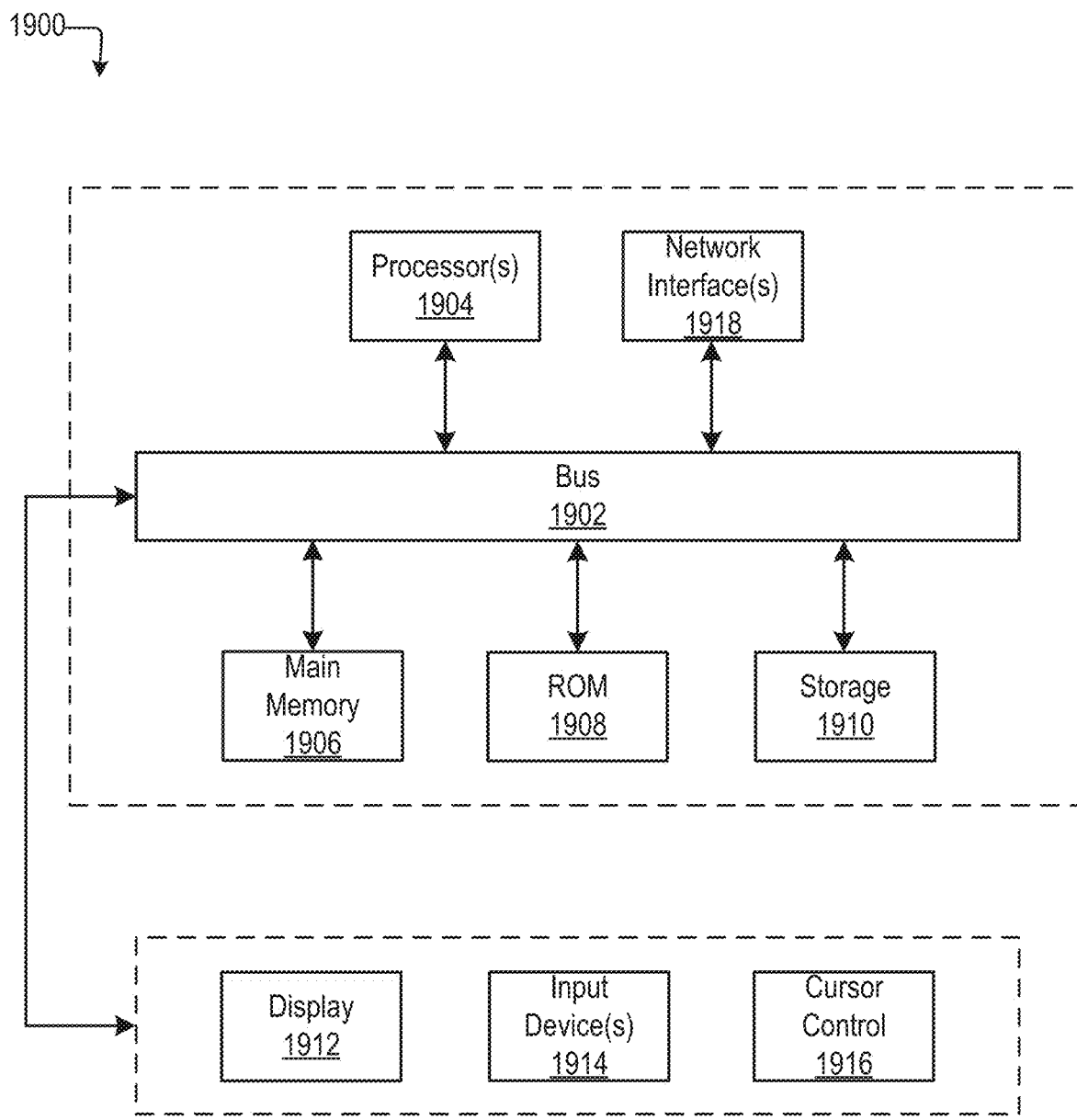
FIG. 19 illustrates a block diagram of an example computer system in which any of the embodiments described herein may be implemented.

FIG. 19 is a block diagram that illustrates a computer system 1900 upon which any of the embodiments described herein may be implemented. In some examples, the computer system 1900 may include a cloud-based or remote computing system. For example, the computer system 1900 may include a cluster of machines orchestrated as a parallel processing infrastructure. The computer system 1900 includes a bus 1902 or other communication mechanism for communicating information, one or more hardware processors 1904 coupled with bus 1902 for processing information. Hardware processor(s) 1904 may be, for example, one or more general purpose microprocessors.

The computer system 1900 also includes a main memory 1906, such as a random access memory (RAM), cache and/or other dynamic storage devices, coupled to bus 1902 for storing information and instructions to be executed by processor 1904. Main memory 1906 also may be used for storing temporary variables or other intermediate information during execution of instructions to be executed by processor 1904. Such instructions, when stored in storage media accessible to processor 1904, render computer system 1900 into a special-purpose machine that is customized to perform the operations specified in the instructions.

The computer system 1900 further includes a read only memory (ROM) 1908 or other static storage device coupled to bus 1902 for storing static information and instructions for processor 1904. A storage device 1910, such as a magnetic disk, optical disk, or USB thumb drive (Flash drive), etc., is provided and coupled to bus 1902 for storing information and instructions.

The computer system 1900 may be coupled via bus 1902 to a display 1912, such as a cathode ray tube (CRT) or LCD display (or touch screen), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1900 may implement the techniques described herein using customized hard-wired logic, one or more ASICs or FPGAs, firmware and/or program logic which in combination with the computer system causes or programs computer system 1900 to be a special-purpose machine. According to one embodiment, the techniques herein are performed by computer system 1900 in response to processor(s) 1904 executing one or more sequences of one or more instructions contained in main memory 1906. Such instructions may be read into main memory 1906 from another storage medium, such as storage device 1910. Execution of the sequences of instructions contained in main memory 1906 causes processor(s) 1904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1910. Volatile media includes dynamic memory, such as main memory 1906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1902. Transmission media can also take the form of acoustic or light waves, such as those generated during radio-wave and infra-red data communications.

Various forms of media may be involved in carrying one or more sequences of one or more instructions to processor 1904 for execution. For example, the instructions may initially be carried on a magnetic disk or solid state drive of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infra-red signal and appropriate circuitry can place the data on bus 1902. Bus 1902 carries the data to main memory 1906, from which processor 1904 retrieves and executes the instructions. The instructions received by main memory 1906 may retrieves and executes the instructions. The instructions received by main memory 1906 may optionally be stored on storage device 1910 either before or after execution by processor 1904.

The computer system 1900 also includes a communication interface 1918 coupled to bus 1902. Communication interface 1918 provides a two-way data communication coupling to one or more network links that are connected to one or more local networks. For example, communication interface 1918 may be an integrated services digital network (ISDN) card, cable modem, satellite modem, or a modem to provide a data communication connection to a corresponding type of telephone line. As another example, communication interface 1918 may be a local area network (LAN) card to provide a data communication connection to a compatible LAN (or WAN component to communicated with a WAN). Wireless links may also be implemented. In any such implementation, communication interface 1918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1918, which carry the digital data to and from computer system 1900, are example forms of transmission media.

The computer system 1900 can send messages and receive data, including program code, through the network(s), network link and communication interface 1918. In the Internet example, a server might transmit a requested code for an application program through the Internet, the ISP, the local network and the communication interface 1918.

The received code may be executed by processor 1904 as it is received, and/or stored in storage device 1910, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be removed, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that "logic," a "system," "data store," and/or "database" may comprise software, hardware, firmware, and/or circuitry. In one example, one or more software programs comprising instructions capable of being executable by a processor may perform one or more of the functions of the data stores, databases, or systems described herein. In another example, circuitry may perform the same or similar functions. Alternative embodiments may comprise more, less, or functionally equivalent systems, data stores, or databases, and still be within the scope of present embodiments. For example, the functionality of the various systems, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any figure or example can be combined with one or more features of any other figure or example. A component being implemented as another component may be construed as the component being operated in a same or similar manner as the another component, and/or comprising same or similar features, characteristics, and parameters as the another component.

The phrases "at least one of," "at least one selected from the group of," or "at least one selected from the group consisting of," and the like are to be interpreted in the disjunctive (e.g., not to be interpreted as at least one of A and at least one of B).

Reference throughout this specification to an "example" or "examples" means that a particular feature, structure or characteristic described in connection with the example is included in at least one example of the present invention. Thus, the appearances of the phrases "in one example" or "in some examples" in various places throughout this specification are not necessarily all referring to the same examples, but may be in some instances. Furthermore, the particular features, structures, or characteristics may be combined in any suitable manner in one or more different examples.

The invention claimed is:

1. A system comprising:
   one or more processors; and
   a memory storing instructions that, when executed by the one or more processors, cause the system to perform:
      receiving a first representation of an unstructured data entity, wherein the first representation comprises any indication of a detection, the unstructured data entity being comprised within a corpus;
      generating, using a plurality of machine learning components, second representations of the unstructured data entity, wherein at least a portion of the machine learning components comprise different models, were trained according to different training data, or were queried according to different inputs besides the unstructured data entity, the generating of each second representation of the second representations comprises, using a different machine learning component:
         detecting any object, any intention of the object, any state of the object, or any activity of the object within the unstructured data entity;
         in response to detecting the any object, the any intention, the any state, or the any activity:
            annotating the unstructured data entity according to the any detected object, the any detected intention, the any detected state, or the any detected activity:
      resolving the second representations based on a consensus, wherein the consensus is based on a most frequently occurring common annotation by the machine learning components;
      determining any discrepancy between the first representation and the resolved second representations, wherein the any discrepancy comprises any difference in an existence or an absence of the detection, in a relative position of the detection, or in a type or a classification of the detection;
      receiving feedback regarding the any discrepancy; and
      selectively modifying, or selectively prompting the modification of, the first representation based on the any discrepancy and the feedback, wherein the selectively modifying of the first representation comprises generating a first common annotation on the first representation in response to the feedback indicating a veracity of the most frequently occurring common annotation;
      generating a training dataset for a different machine learning component using the selectively modified first representation; and
      training the different machine learning component based on the generated training dataset.

2. The system of claim 1, wherein the second representations are resolved according to the consensus, the consensus being determined according to respective outputs among machine learning components, and the selectively modifying, or selectively prompting the modification of, the first representation, comprises selectively relabeling, or selectively prompting the relabeling of, the first representation.

3. The system of claim 2, wherein the received feedback is associated with whether the first representation is mislabeled; and the selectively relabeling, or selectively prompting the relabeling of, the first representation, comprises:
transmitting an indication regarding the any discrepancy between the first representation and the resolved second representations; and
selectively adding, removing, or changing a labeling, or selectively prompting the adding, removing, or changing of the labeling of, the first representation based on the determination of any discrepancy and the feedback.

4. The system of claim 3, wherein the selectively adding, removing, or changing a labeling, or selectively prompting the adding, removing, or changing of the labeling of, the first representation comprises:
prompting the adding, removing, or changing of the labeling of the first representation in response to the feedback confirming a veracity of the resolved second representations; and
leaving the first representation unchanged in response to the feedback confirming a veracity of the first representation.

5. The system of claim 1, wherein the unstructured data entity comprises a media entity or unstructured text.

6. The system of claim 5, wherein the unstructured data entity comprises a media entity; and the first representation or the resolved second representations comprise one or more bounding boxes and one or more respective annotations corresponding to the bounding boxes.

7. The system of claim 5, wherein the resolved second representations correspond to a subset of representations generated or outputted from respective machine learning components, the subset of representations corresponding to an indication of an existence or an absence of the detection.

8. The system of claim 1, wherein the detection comprises an object, an event, or an inference.

9. The system of claim 1, wherein the instructions further cause the system to perform:
determining a first score indicative of a degree of certainty of the existence of the any detection based on a proportion of machine learning components indicating the existence of the any detection, wherein the receiving of the feedback is in response to the first score satisfying a threshold.

10. The system of claim 1, wherein the first representation is manually annotated.

11. The system of claim 1, wherein the generating of the bounding boxes is performed using a parallel compute framework.

12. The system of claim 1, wherein the consensus comprises less than a majority of the machine learning components.

13. A method comprising:
receiving a first representation of an unstructured data entity, wherein the first representation comprises any indication of a detection, the unstructured data entity being comprised within a corpus;
generating, using a plurality of machine learning components, second representations of the unstructured data entity, wherein at least a portion of the machine learning components comprise different models, were trained according to different training data, or were queried according to different inputs besides the unstructured data entity, the generating of each second representation of the second representations comprises, using a different machine learning component:
detecting any object, any intention of the object, any state of the object, or any activity of the object within the unstructured data entity;
in response to detecting the any object, the any intention, the any state, or the any activity:
annotating the unstructured data entity according to the any detected object, the any detected intention, the any detected state, or the any detected activity:
resolving the second representations based on a consensus, wherein the consensus is based on a most frequently occurring common annotation by the machine learning components;
determining any discrepancy between the first representation and the resolved second representations, wherein the any discrepancy comprises any difference in an existence or an absence of the detection, in a relative position of the detection, or in a type or a classification of the detection;
receiving feedback regarding the any discrepancy; and
selectively modifying, or selectively prompting the modification of, the first representation based on the any discrepancy and the feedback, wherein the selectively modifying of the first representation comprises generating a first common annotation on the first representation in response to the feedback indicating a veracity of the most frequently occurring common annotation;
generating a training dataset for a different machine learning component using the selectively modified first representation; and
training the different machine learning component based on the generated training dataset.

14. The method of claim 13, wherein the second representations are resolved according to the consensus, the consensus being determined according to respective outputs among machine learning components, and the selectively modifying, or selectively prompting the modification of, the first representation, comprises selectively relabeling, or selectively prompting the relabeling of, the first representation.

15. The method of claim 14, wherein the received feedback is associated with whether the first representation is mislabeled; and the selectively relabeling, or selectively prompting the relabeling of, the first representation, comprises:
transmitting an indication regarding the any discrepancy between the first representation and the resolved second representations; and
selectively adding, removing, or changing a labeling, or selectively prompting the adding, removing, or changing of the labeling of, the first representation based on the determination of any discrepancy and the feedback.

16. The method of claim 15, wherein the selectively adding, removing, or changing a labeling, or selectively prompting the adding, removing, or changing of the labeling of, the first representation comprises:
prompting the adding, removing, or changing of the labeling of the first representation in response to the feedback confirming a veracity of the resolved second representations; and
leaving the first representation unchanged in response to the feedback confirming a veracity of the first representation.

17. The method of claim 13, wherein the unstructured data entity comprises a media entity or unstructured text.

18. The method of claim 17, wherein the unstructured data entity comprises a media entity; and the first representation or the resolved second representations comprise one or more bounding boxes and one or more respective annotations corresponding to the bounding boxes.

19. The method of claim 17, wherein the resolved second representations correspond to a subset of representations generated or outputted from respective machine learning components, the subset of representations corresponding to an indication of an existence or an absence of the detection.

20. The method of claim 13, further comprising:
determining a first score indicative of a degree of certainty of the existence of the any detection based on a proportion of machine learning components indicating the existence of the any detection, wherein the receiving of the feedback is in response to the first score satisfying a threshold.

\* \* \* \* \*